(12) United States Patent
Ma

(10) Patent No.: US 10,778,530 B2
(45) Date of Patent: Sep. 15, 2020

(54) DEVICE DISCOVERY USING HEARTBEAT SIGNALS

(71) Applicant: Intel Corporation, Santa Clara, CA (US)

(72) Inventor: Chung-Wen Ma, Taipei (TW)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/233,561

(22) Filed: Dec. 27, 2018

(65) Prior Publication Data

US 2019/0140908 A1    May 9, 2019

(51) Int. Cl.
*H04L 12/24* (2006.01)
*H04L 12/26* (2006.01)
*H04W 48/16* (2009.01)
*H04W 8/00* (2009.01)
*H04W 88/08* (2009.01)

(52) U.S. Cl.
CPC .......... *H04L 41/12* (2013.01); *H04L 41/5058* (2013.01); *H04L 43/10* (2013.01); *H04W 8/005* (2013.01); *H04W 48/16* (2013.01); *H04W 88/08* (2013.01)

(58) Field of Classification Search
CPC ..... H04L 41/12; H04L 41/5058; H04L 43/10; H04L 41/04; H04L 41/085; H04L 45/02; H04W 48/16; H04W 8/005; H04W 88/08; H04W 84/18
See application file for complete search history.

(56) References Cited

U.S. PATENT DOCUMENTS

| | | | |
|---|---|---|---|
| 7,120,688 B1 * | 10/2006 | Nguyen ................. | H04L 43/10 709/224 |
| 7,451,359 B1 * | 11/2008 | Coekaerts ........... | G06F 11/0709 709/223 |
| 9,712,947 B2 * | 7/2017 | Dina ..................... | B23K 9/1087 |
| 2018/0227649 A1 * | 8/2018 | Corbin ..................... | H04Q 9/00 |

* cited by examiner

*Primary Examiner* — Sharad Rampuria
(74) *Attorney, Agent, or Firm* — Schwabe, Williamson & Wyatt, P.C.

(57) ABSTRACT

Systems, methods, and computer-readable media are provided for wireless communications and computer networking, including wireless sensor networks. In embodiments, a first device stores an indication of a received second heartbeat signal broadcasted by a second device. The second heartbeat signal is for accessing or maintaining a service provided by a service provider and/or an access network node (AN). The first device generates a first heartbeat signal to include the indication of the second heartbeat signal. The indication of the second heartbeat signal in the first heartbeat signal is for facilitating discovery of the second device by the AN. Other embodiments are disclosed and/or claimed.

25 Claims, 13 Drawing Sheets

1100

DEVICE DISCOVERY USING HEARTBEAT SIGNALS

FIELD

Embodiments discussed herein are related to computing, and in particular, to wireless communications and wireless networks.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

In order for user devices to access services from service providers or attach to a network, the user devices need to discover or be discovered by an access node (AN), such as a cellular base station, a WiFi® access point (AP), or a mesh networking AP. Typically, user devices need to perform a discovery procedure and/or a network attachment procedure in order to be identified for search and management purposes. Discovery failures may occur, for example, when the AN lacks signaling resources or is otherwise overloaded; when a user device is located in a coverage hole, a coverage blind spot, or when the line of sight of AN is obstructed; and/or when the user device has limited transmitter capabilities due to size and/or power limitations.

Mesh networking can sometimes alleviate coverage hole or coverage blind spot issues. Mesh networking is a local networking topology in which network nodes, including networking elements (e.g., bridges, routers, switches, beacons, etc.), connect directly to as many other network nodes as possible in a non-hierarchical fashion. This network topology allows data to be routed efficiently between source and destination nodes using one or more paths. Mesh networks can employ point-to-point (P2P) or point-to-multipoint (P-MP) connections to exchange data.

One message relaying technique employed by mesh networks is "flooding" where a packet from a source node is propagated to all connected nodes, each of which broadcast the packet to other nodes in the network until the packet reaches the destination node. However, using flooding techniques may lead to network congestion due to packet collisions, especially in dense networks. Flooding can also be costly in terms of wasted bandwidth since packets have to be sent to every connected node. Additionally, packets can become duplicated in the network further increasing the load on the networks bandwidth as well as requiring an increase in processing complexity to disregard duplicate messages.

A message relaying technique employed by mesh networks is "routing" where a packet from a source node is propagated along a path by hopping from node to node until the packet reaches a destination node. To ensure that all paths are available, the network must allow for continuous connections and must reconfigure itself around broken paths using self-healing algorithms such as a Shortest Path Bridging algorithm. However, since routing techniques rely on paths between nodes to convey packets, the nodes in a wireless mesh network may need to be relatively close to one another to ensure that at least some paths are available. This may result in unnecessary device density, which may lead to interference and congestion issues.

One way to avoid these issues in routing-based mesh networks is to employ beacon devices, which forward or relay packets between nodes. However, most beacons typically have their receivers continuously active, requiring a more robust power supply than other nodes in the network. Additionally, most beacons are unable to discover the presence of unknown devices or devices located in coverage holes or blind spots since they are usually required to receive packets from known network nodes.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 4 shows heartbeat signaling procedure according to various embodiments;

FIG. 5 shows an example heartbeat process to be performed by a covered device according to various embodiments;

FIG. 6 shows an example heartbeat process to be performed by a uncovered device according to various embodiments; and FIG. 7 shows an example heartbeat process to be performed by a service provider according to various embodiments.

DETAILED DESCRIPTION

Figure 1:
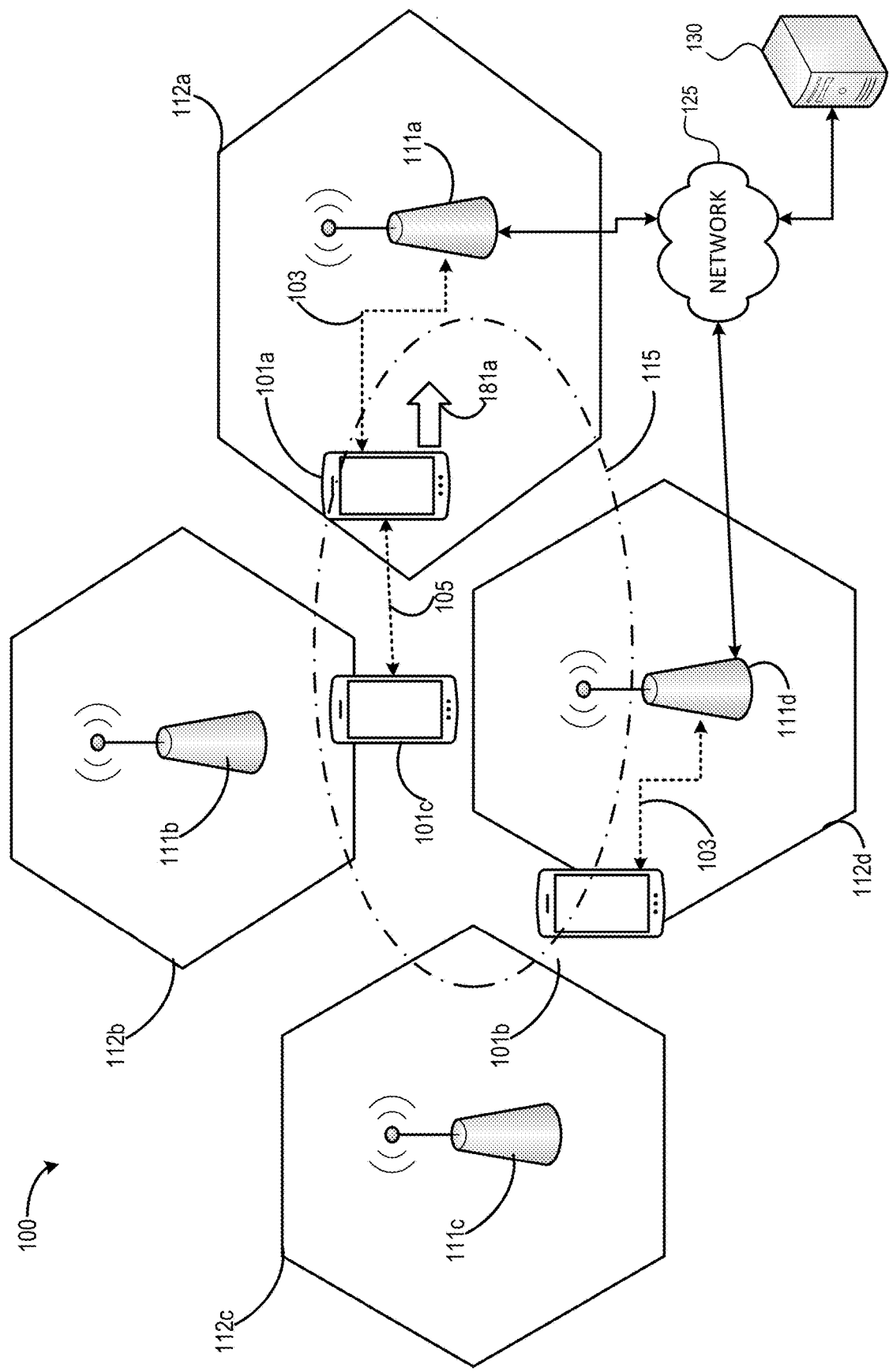
FIG. 1 illustrates an example environment in which various embodiments of the present disclosure may be practiced.

Disclosed embodiments are related to wireless communications among computing devices in wireless networks. In order for user devices to access services from service providers, the user devices need to perform a network discovery procedure or a network attachment procedure with an access network (AN) node, such as a cellular base station, WiFi access point (AP), mesh networking node, or the like. Discovery is a process through which computers and network devices are able to find each other, connect with one another, and communicate with each other. Similarly, network attachment is a process that user devices need to perform in order to register with a network and receive services that require registration. In order to perform a network attachment procedure, the user device still needs to be discovered by an AN node. As mentioned previously, discovery failures may occur, inter alia, when user devices are located in a coverage hole, blind spot, or due to line of sight obstructions, and/or when user devices have limited transmitter capabilities due to size and/or power limitations.

In disclosed embodiments, heartbeat signals are used to enhance the discovery capabilities for client devices. Heartbeat signals are signals generated by hardware or software on a periodic basis, and are usually used to indicate normal operation of a system, whether a service or session is still active, to synchronize one or more components, modules, or services within the system, and/or to synchronize multiple devices within a network. Many applications and communication protocols require heartbeat signals to be broadcast or sent to peer devices or AN nodes at regular intervals to inform the peer devices or AN nodes of the operational status of the subject device. Usually a heartbeat signal is sent between peer machines/devices at a regular interval, where one peer machine/device is considered to have failed if the other peer machine/device does not receive a heartbeat signal within a defined period of time, for example, one or more heartbeat intervals. Although heartbeat signals can vary in size depending on application or protocol requirements, in general, very little resources are required to generate and broadcast heartbeat signals. In various embodiments, client devices may detect or otherwise receive broadcasted heartbeat signals from other devices, and provide an indication of the obtained heartbeat signals to AN nodes when performing their own discovery procedures with the AN nodes.

For example, a first device may detect and record the heartbeat signal broadcasted by a second device when the first device passes or becomes proximate to the second device. In this example, the second device may be located in an area where the second device cannot detect or discover an AN node (or be detected/discovered by an AN node), or the second device may have a relatively weak transmitter that is unable to broadcast the heartbeat signal to a closest AN node. After the first device records the heartbeat signal of the second device, the first device inserts an indicator into its own heartbeat signal to indicate the recorded heartbeat signal. The first device transmits or broadcasts its own heartbeat signal to an AN node. In this example, the first device may broadcast its heartbeat signal when it performs a discovery procedure with an AN node (e.g., upon entering a coverage area of the AN node or becoming proximate to the AN node), or during a predefined interval defined for the heartbeat signal. In embodiments, the AN node may send an acknowledgement message to the first device, where the ACK message indicates proper receipt and/or decoding of the heartbeat signal. In these embodiments, the first device flushes the recorded heartbeat signal of the second device from its memory when it receives the ACK message, which allows it to use its memory/storage resources for other detected heartbeat signals. Additionally, the An may use the indication of the heartbeat signal of the second device to alter or adjust its network service parameters in order to discovery the second device or to allow the second device to discover the AN node. Other embodiments are described and/or claimed.

I. HEARTBEAT SIGNAL EMBODIMENTS

Turning now to FIG. 1, an example environment 100 in which various embodiments of the present disclosure may be practiced, is shown. The environment 100 shown by FIG. 1 is a distributed wireless network architecture comprising multiple wireless nodes, some or all of which may include multiple network access technologies (or "network interfaces") for accessing services from a service provider system 130.

As illustrated, the environment 100 includes user equipment (UEs) 101a, 101b, and 101c (collectively referred to as "UEs 101" or "UE 101"), access network (AN) nodes 111a, 111b, and 111c (collectively referred to as "AN nodes 111"), network 125, and an server(s) 130, each of which are incorporated with the teachings of the present disclosure. The entities in the distributed wireless network 100 may be considered "network nodes" or "nodes" that communicate among themselves in multi-hop fashion. The term "hop" may refer to an individual node or intermediary device through which data packets traverse a path between a source device and a destination device, and a "hop count" may refer to a number of intermediate devices through which data passes between the source device and the destination device. Intermediate nodes (i.e., nodes that are located between a source node and a destination node along a path) are allowed to modify packet contents as sensed data from several nodes can be combined/aggregated/compressed on the way to the final destination node. One or more nodes may have multiple wireless network interfaces over which to communicate with one another.

The environment 100 may represent a multitude of computer networks. In a first example, the environment 100 may be a heterogeneous wireless network in which different UEs 101 of varying types interact with one another. In a second example, the environment 100 may be a decentralized V2X network comprising vehicle UEs 101 with one or multiple network interfaces, road side units (RSUs) 111, and macro-cell base stations 111. As used herein, the terms "vehicle-to-everything" and "V2X" may refer to any communication involving a vehicle as a source or destination of a message. Additionally, the terms "vehicle-to-everything" and "V2X" as used herein may also encompass or be equivalent to vehicle-to-vehicle (V2V communications, vehicle-to-infrastructure (V2I) communications, vehicle-to-network (V2N) communications, vehicle-to-pedestrian (V2P) communications, enhanced V2X (eV2X), or the like. In a third example, environment 100 may be an IoT network comprising heterogeneous IoT devices 101 with one or more network interfaces, one or more access points 111 and/or gateway devices, and the like. An IoT network 100 interconnecting IoT UEs 101 may include uniquely identifiable embedded computing devices (within the Internet infrastructure) with short-lived connections. The nodes in environment 100 of the third example may be a wireless sensor network (WSN), where the IoT UEs 101 are small, low-cost sensor nodes comprising sensing, processing, and wireless communication capabilities. The environment 100 in the third example may be the same or similar to the example embodiments shown and described with regard to FIGS. 10-13.

As shown by FIG. 1, the environment 100 includes the UEs 101, each of which includes heartbeat signal generation circuitry as discussed herein. Although FIG. 1 shows the UEs 101 as handheld devices, the UEs 101 may be any type of computing device including a wireless communications interface, which allow the UEs 101 to, among other things, share information with one another over respective connections (also referred to as "channels" or "links") 105, and with AN nodes 111 over respective connections 103. For example, the UE 101b utilizes a connection 103 with AN 111d, and UE 101a utilizes a connection 103 with AN 111a.

Each of the connections 103 comprises a physical communications interface or layer. In this example, the connections 103 are illustrated as air interfaces to enable communicative couplings, and are consistent with wireless area network (WAN), wireless local area network (WLAN), or any other IEEE 802.11 protocols (e.g., WiFi®, DSRC/WAVE, etc.); cellular communications protocols (e.g., a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, a Worldwide Interoperability for Microwave Access (Wi-MAX) protocol, etc.), and/or any of the other communications protocols, such as those discussed herein. Additionally, the UEs 101 may directly exchange communication data using direct links 105. For example, the UE 101a utilizes a direct connection 105 with UE 101c. The direct links 105 may include DSRC interfaces, 3GPP interfaces (Proximity Services (ProSe), sidelink (SL), or device-to-device (D2D) interfaces), and/or some other suitable direct communication technology, such as one or more person-to-person (P2P) or personal area network (PAN) protocols (e.g., IEEE 802.15.4 based protocols including ZigBee™, IPv6 over Low power Wireless Personal Area Networks (6LoWPAN), WirelessHART, MiWi, Thread, etc.; WiFi-direct; Bluetooth®/BLE protocols; ANT/ANT+ protocols; Z-Wave; UPnP; and/or the like).

When the environment 100 is an IoT network, the UEs 101 are IoT devices that are the same or similar to the IoT devices 1004 and 1304 discussed infra. In some embodiments, the IoT UEs 101 are small and low-cost sensor nodes (nodes) part of a wireless sensor network (WSN), where each node includes sensing, data processing, and communication capabilities. The sensing capabilities may include magnetic, thermal, infrared, acoustic, radar, and/or other like sensing capabilities. For the communication capabilities, the IoT UE(s) 101 may comprise a network access layer designed for low-power IoT applications utilizing short-lived UE connections. the IoT UE(s) 101 may execute background applications (e.g., keep-alive messages, status updates, etc.) to facilitate the connections of the IoT network and/or WSN. The IoT UE(s) 101 can utilize technologies such as machine-to-machine (M2M) or machine-type communications (MTC) devices for exchanging data with an MTC server (e.g., server(s) 130) or device via a public land mobile network (PLMN), Proximity-Based Service (ProSe) or device-to-device (D2D) communication, sensor networks or WSNs, or IoT networks (such as those discussed previously). The M2M or MTC exchange of data may be a machine-initiated exchange of data or may be based on sensed/detected events. In some embodiments, the IoT UEs 101 may act as relay nodes to forward data from one IoT UE 101 to server(s) 130 through a path of a relay node IoT UEs 101 and an AN 111 in the IoT network 100.

The UEs 101 are configured to connect, for example, communicatively couple, with one or more ANs or radio ANs (RANs). An example implementation of the AN nodes 111 is shown and described with regard to Figure XS1. The (R)ANs can include one or more AN nodes 111 that enable connections with corresponding networks. The AN nodes 111 can be referred to as base stations (BS), next Generation NodeBs (gNBs), RAN nodes, evolved NodeBs (eNBs), NodeBs, Road Side Units (RSUs), Transmission Reception Points (TRxPs or TRPs), Access Points (APs), wireless AP (WAP), and so forth, and can comprise ground stations (e.g., terrestrial access points) or satellite stations providing coverage within a geographic area (e.g., a cell or coverage area). Where one or more AN nodes 111 are APs or WAPs, such as WiFi routers with radiofrequency circuitry, the connections 103 can comprise a local wireless connection, such as a connection consistent with any IEEE 802.11 protocol. One or more of the AN nodes 111 may be cellular base stations such as next generation (NG) RAN nodes that operate in an NR or 5G system (e.g., a gNB), Evolved Universal Mobile Telecommunications System (UMTS) Terrestrial Radio Access Network (E-UTRAN) node that operates in an LTE or 4G system (e.g., an eNB), a legacy RAN, such as a UMTS Terrestrial Radio Access Network (UTRAN) node or GERAN (GSM (Global System for Mobile Communications or Groupe Special Mobile) EDGE (GSM Evolution) Radio Access Network) node, or some other cellular base station. These AN nodes 111 may be implemented as one or more of a dedicated physical device such as a macrocell base station and/or a low power (LP) base station for providing femtocells, picocells or other like cells having smaller coverage areas, smaller user capacity, or higher bandwidth compared to macrocells. In other embodiments, the AN 111 may be implemented as one or more software entities running on server computers as part of a virtual network, which may be referred to as a cloud RAN (CRAN), virtual RAN, virtual baseband (BB) unit, cloud-based or virtual BB pool, and/or the like. In other embodiments, the AN 111 may represent individual gNB-distributed units (DUs) that are connected to a gNB-centralized unit (CU) via an F1 interface (not shown). Any of the AN nodes 111 can terminate respective air interface protocols and can be the first point of contact for a UE 101. In some embodiments, any of the AN nodes 111 can fulfill various logical functions for a respective RAN including, but not limited to, radio network controller (RNC) functions such as radio bearer management, uplink and downlink dynamic radio resource management and data packet scheduling, and mobility management.

As alluded to previously, the UEs 101 and the AN nodes 111 include or incorporate the heartbeat signaling technology of the present disclosure, which allows the UEs 101 to share heartbeat signals with one another to facilitate discovery of inaccessible or non-covered UEs 101 by the AN nodes 111, and allow the AN nodes 111 to predict the location of the uncovered or out-of-reach UEs 101 from the UEs 101 carrying the heartbeats. Current networking technologies, such as cellular, WiFi, Bluetooth/BLE, direct satellite link, etc., include some sort of mechanism to continuously update itself about service coverage, performance, and efficiency. Many networking technologies utilize heartbeat signals between UEs 101 and network elements to maintain data link connections with the UEs 101. For example, in most cellular networks, an AN node 111 may allocate resources for a UE 101 to communicate over a particular channel, where continued access to the channel by the UE 101 requires that the UE 101 to indicate to the network (e.g., an AN node 111) that the UE 101 is still using the channel. If the network does not receive the indication (e.g., a heartbeat signal) from the UE 101, the network (e.g., an AN node 111) will end the connection.

Embodiments herein utilize heartbeat signaling to relay device information to AN nodes 111, which allow the AN nodes 111 to better identify or predict a location of undiscovered devices and adjust a search area and/or search direction to discover undiscovered devices. The embodiments improve computer networks, and wireless communications in particular, by reducing computational and signaling overhead in service coverage areas 112. This is because generating and broadcasting heartbeat signals is relatively inexpensive (in terms of computational and signaling resources) for most UEs 101 when compared to the resources needed to produce other types of transmissions. Additionally, AN nodes 111 may also conserve network resources by focusing their search/discovery parameters using the information conveyed in a heartbeat signal that was carried forward by another heartbeat signal. Furthermore, since most commonly used applications and communications technologies use heartbeat signals, the embodiments may be easily implemented in existing equipment without requiring substantial hardware or software upgrades.

As mentioned previously, a heartbeat signal is a signal that is repeatedly generated by hardware or software used to indicate normal operation of a machine or device, such as UEs 101. Typically, a heartbeat signal is sent at regular intervals, for example, two or more heartbeat signals per second. The heartbeat signals include packets called "heartbeat packets" or "heartbeats." If a peer device (or "endpoint") does not receive a heartbeat signal for a predefined period of time, such as one or more heartbeat intervals, the device or machine is assumed to have failed and corrective action is triggered. According to various embodiments, heartbeat signals are broadcast or sent in a channel 103, 105 at regular intervals, and is still used to inform peer devices of a live status.

In the example illustrated by FIG. 1, there are four AN nodes 111 (i.e., AN node 111a, 111b, 111c, and 111d) each of which include corresponding service coverage areas 112 (including coverage areas 112a, 112b, 112c, and 112d). In this example, UE 101c is the "uncovered device," which is not currently being served by an AN node 111 and is unable to detect the service from either AN node 111. The UE 101c may be located in a coverage hole or a coverage blind spot in this example. A coverage hole and blind spots are areas where signal strength (e.g., pilot signal strength) is below a threshold which is required by a UE 101 to access the network, or the signal-to-interference-plus-noise ratios (SINRs) of both a serving and neighbor AN nodes 111 is below a level needed to maintain the basic service. Coverage holes are usually caused by physical obstructions such as new buildings, hills, or by unsuitable antenna parameters, or just inadequate RF planning. UEs 101 in a coverage hole will suffer from call drops and radio link failures. Typical phenomenon of coverage holes is either HO failure happens frequently and cannot be optimized by HO parameter optimization or call drop happens frequently and cannot be rescued by RRC re-establishment.

In this example, the UE 101a passes by or otherwise approaches UE 101c. According to various embodiments, when the UEs 101a and 101c approach each other, they broadcast respective heartbeat signals which are recorded by the other UE 101. For example, the UE 101a generates and broadcasts a first heartbeat signal, which is detected and recorded by UE 101c; and the UE 101c generates and broadcasts a second heartbeat signal, which is detected and recorded by UE 101a. After the second heartbeat signal is recorded by UE 101a, the UE 101a enters the service coverage area 112a (which is indicated by arrow 181a), and determines that it should broadcast a heartbeat signal for AN 111a. The UE 101a generates a heartbeat message (packet) with an indicator indicating the recorded second heartbeat signal from UE 101c, encodes the heartbeat message in a first heartbeat signal, and broadcasts the a first heartbeat signal in the coverage area 112a (note that the first heartbeat signal broadcasted by the UE 101a in coverage area 112a is different than the first heartbeat signal recorded by UE 101c). The AN node 111a detects the first heartbeat signal broadcasted by the UE 101a in coverage area 112a with the indication of the second heartbeat signal generated by the UE 101c. Additionally, UE 101b may approach UE 101c, record a heartbeat signal broadcasted by UE 101c, and when UE 101b enters the service coverage area 112d of AN 111d, the UE 101b may generate a heartbeat signal for discovery by the AN 111d to indicate the existence of UE 101c. In this example, the AN node 111a uses the information of the second heartbeat signal included in the first heartbeat signal to predict a roaming area 115 of the UE 101c, and may adapt its coverage area 112a to facilitate network discovery with UE 101c. Other mechanisms may be used to facilitate discovery with UE 101c in other embodiments.

To detect devices in coverage holes or blind spot, such as UE 101c in the example of FIG. 1, the AN nodes 111 may expand their service coverage ranges or perform an RF scan of a wider area. When trying to reach uncovered devices (e.g., UE 101c), the location of the uncovered devices can be narrowed down to a certain area and predicted using heartbeat information included in the heartbeat signals. In some embodiments, the AN nodes 111 may include suitable positioning or localization functions for predicting the roaming area of uncovered devices based on the information included in the heartbeat signals. In embodiments where AN nodes 111 are cellular base stations, a network management (NM) entity in a core network (not shown) may instruct self-organizing network (SON) functions of the AN nodes 111 to adjust one or more service parameters (e.g., antenna tilt, antenna azimuth, downlink transmit power, cell (or coverage area) size, cell (or coverage area) capacity, cell (or coverage area) shape, one or more handover parameters, an idle mobility configuration, one or more random access channel (RACH) parameters, one or more cell individual offset (CIO) parameters, etc.) to provide service to the uncovered devices. In these embodiments, the SON functions may be implemented to determine the particular configuration parameters that need to be changed and new values to be used for changing the determined configuration parameters, a time duration of how long the configuration parameter should be changed for and/or not be interfered with (e.g., the "impact time"), possible impact of a parameter change on other objects (e.g., an "impact area"), and possible impact of the parameter change on one or more key performance indicators. Policies can also be preset by a network operator to avoid conflicts on associated resources (network elements and/or parameters) among SON functions, and to indicate a priority of SON functions and/or configuration parameters to be used to determine the execution order of requests from different SON functions in case of conflicts. In some embodiments, the AN nodes 111 may implement or access artificial intelligence (AI) or machine learning (ML) algorithms to predict the roaming area 115 of uncovered devices. Additionally, the AN nodes 111 may include smart antenna technology and/or adaptive beamforming to focused narrowbeams toward the uncovered devices to assist the uncovered devices in detecting the AN nodes 111. In these ways, the heartbeat carry forward embodiments discussed herein provide scalable discovery mechanisms for efficiently serving UEs 101.

To detect and receive heartbeat signals, the UEs 101 may perform one or more medium-sensing operations and/or carrier-sensing operations, utilizing at least energy detection (ED) to determine the presence or absence of other signals on a channel in order to determine if a channel is occupied or clear. To determine the presence or absence of other signals, ED includes sensing radiofrequency (RF) energy across an intended transmission band for a predefined or configured period of time and comparing the sensed RF energy to a predefined or configured threshold. If the sensed RF energy is at or above the predefined or configured threshold, the UE 101 may determine that the channel includes a heartbeat signal, and may convert the signals into digital data according to known methods.

Still referring to FIG. 1, the network 125 comprises computers, network connections among the computers, and software routines to enable communication between the computers over network connections. In this regard, the network 125 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without radio frequency (RF) communications circuitry), routers, switches, hubs, radio beacons, base stations, picocell or small cell base stations, and/or any other like network device. Connection to the network 125 may be via a wired or a wireless connection using the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. More than one network may be involved in a communication session between the illustrated devices. Connection to the network 125 may require that the computers execute software routines which enable, for example, the seven layers of the OSI model of computer networking or equivalent in a wireless (cellular) phone network. Network 125 may be used to enable relatively long-range communication such as, for example, between the one or more server(s) 130 and one or more UEs 101. The network 125 may represent the Internet, one or more cellular networks, local area networks, or wide area networks including proprietary and/or enterprise networks, Transfer Control Protocol (TCP)/Internet Protocol (IP)-based network, or combinations thereof. In such embodiments, the network 125 may be associated with network operator who owns or controls equipment and other elements necessary to provide network-related services, such as one or more base stations or access points, one or more servers for routing digital data or telephone calls (for example, a core network or backbone network), etc.

Still referring to FIG. 1, the one or more server(s) 130 comprise one or more physical and/or virtualized systems for providing functionality (or services) to one or more clients (e.g., UEs 101) over a network (e.g., network 125). The server(s) 130 may include various computer devices with rack computing architecture component(s), tower computing architecture component(s), blade computing architecture component(s), and/or the like. The server(s) 130 may represent a cluster of servers, a server farm, a cloud computing service, or other grouping or pool of servers, which may be located in one or more datacenters. The server(s) 130 may also be connected to, or otherwise associated with one or more data storage devices (not shown). Moreover, the server(s) 130 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art.

Generally, the server(s) 130 offer applications or services that use IP/network resources. As examples, the server(s) 130 may provide traffic management services, cloud analytics, content streaming services, immersive gaming experiences, social networking and/or microblogging services, and/or other like services. In addition, the various services provided by the server(s) 130 may include initiating and controlling software and/or firmware updates for applications or individual components implemented by the UEs 101. The server(s) 130 could also be configured to support communication services such as Voice-over-Internet Protocol (VoIP) sessions, PTT sessions, group communication sessions, and the like for the UEs 101 via the network 125.

Each of the devices shown and described with respect to FIG. 1 may be implemented in hardware, software, or combination thereof. Example hardware implementations may include individual companion silicon or circuitry, including, but not limited to, configurable logic such as, for example, PLAs, FPGAs, CPLDs, programmable SoCs programmed with the operational logic, or fixed-functionality logic hardware using circuit technology such as, for example, ASIC, CMOS, or TTL technology, or any combination thereof. Software implementations may include implementations where the devices shown by FIG. 1 include individual autonomous software agents and/or artificial intelligence (AI) agents developed using a suitable programming language, development tools/environments, etc., which are executed by one or more processors or individual hardware accelerators that are configured with appropriate bit stream(s) or logic blocks to perform their respective functions. Software implementations may additionally or alternatively include implementations in instructions of instruction set architectures (ISA) supported by target processors, or any one of a number of high level programming languages that can be compiled into instruction of the ISA of the target processors. In either software or hardware implementations, especially those embodiments where one of or more subsystems of the UEs 101, AN nodes 111, and/or server(s) 130 includes at least one (trained) neural network in performing their respective determinations and/or assessments (e.g., generating heartbeat signals, detecting uncovered UEs 101, changing service parameters, etc.), at least a portion of the subsystems of the UEs 101, AN nodes 111, and/or server(s) 130 may be implemented in a hardware accelerator (e.g., an FPGA configured with an appropriate bitstream). As examples, the (trained) neural networks may be a multilayer feedforward neural network (FNN), Convolution Neural Network (CNN), Recurrent Neural Network (RNN), and/or some other suitable neural network.

Figure 2:
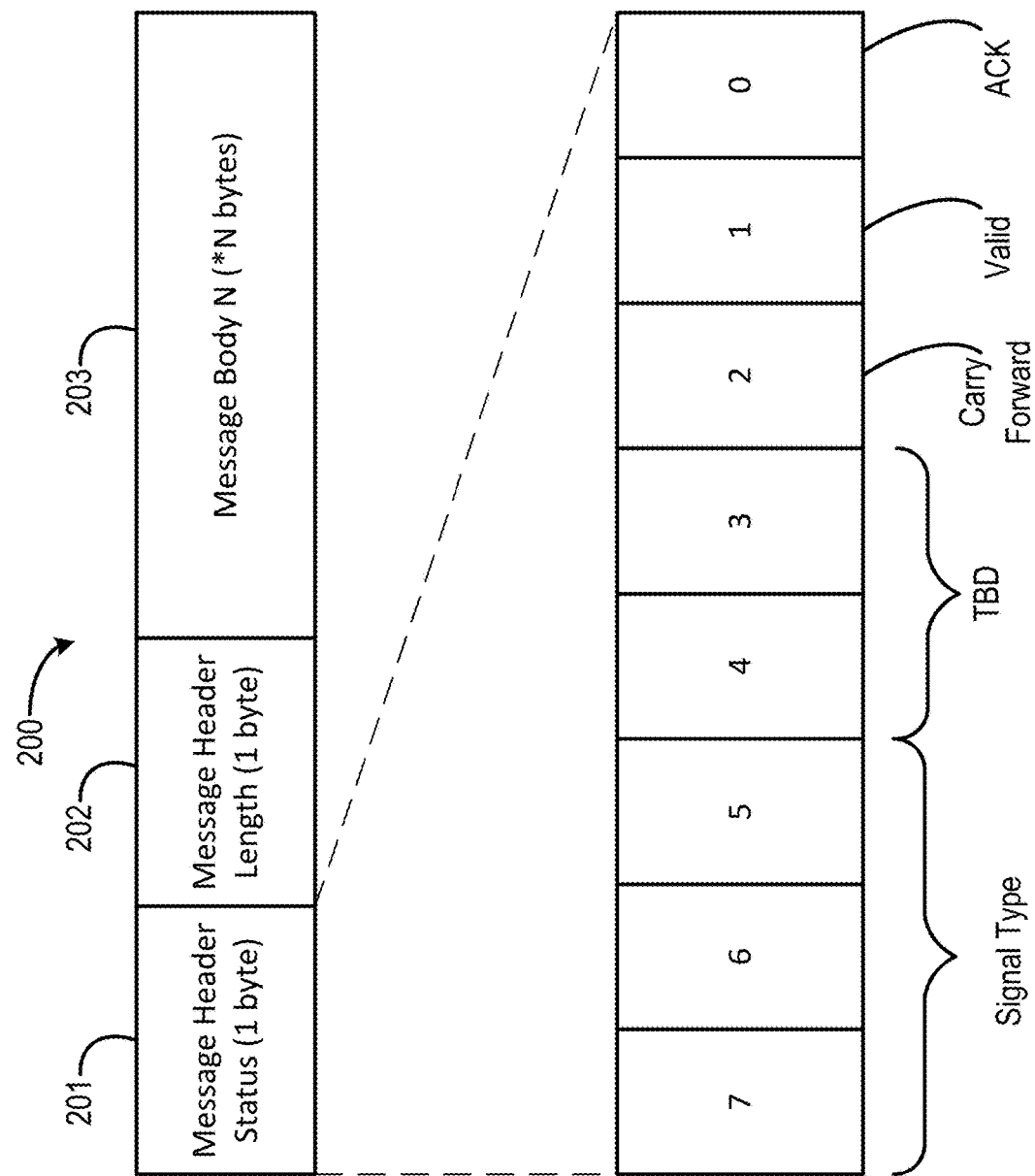
FIG. 2 illustrates an example heartbeat data unit according to various embodiments.

Referring now to FIG. 2, where an example heartbeat protocol data unit (PDU) 200 according to various embodiments, is shown. The heartbeat PDU 200 is a network packet or other like unit of data that is used to carry heartbeat information, where the type of information included in the heartbeat PDU 200 may depend on whether the heartbeat PDU 200 is sent by an uncovered or undiscovered device (e.g., UE 101*c* in the example of FIG. 1), a covered or discoverable device (e.g., UE 101*a* in the example of FIG. 1), or an access network node (e.g., ANs 111 in FIG. 1). Although not shown by FIG. 2, the header portion of the heartbeat PDU 200 may also include control information for addressing and/or routing of the heartbeat PDU 200. The heartbeat PDU 200 may be any suitable unit of information, such as a data link layer frame, a network layer or Internet layer packet, a transport layer datagram or segment, physical layer packets, or some other PDU of some other protocol layer. In some embodiments, the heartbeat PDU 200 may be, or may be included in, one or more a Media Access Control (MAC) frames or control elements (CEs) in WiFi or LTE/NR implementations. In some embodiments, the heartbeat PDU 200 may be included or encapsulated in one or more higher layer PDUs, and/or may be carried by one or more lower layer PDUs. For example, the heartbeat PDU 200 may be a Transmission Control Protocol (TCP) segment that is carried in one or more Internet Protocol (IP) packets, and the one or more IP packets may be encapsulated in one or more physical layer frames.

In this example, the heartbeat PDU 200 includes a message header status field 201 (or "header status 201"), a message header length field 202 (or "header length 202"), and a message body field 203 (or "body 203"). The body 203 is N bytes in length (where N is a number) and carries a payload of the heartbeat PDU 200, which includes heartbeat data to be conveyed to a destination device. The heartbeat data may include a universally unique identifier (UUID) or some other suitable identifier of a UE 101. In various embodiments, the heartbeat PDU 200, and in particular, the body 203, may be designed to carry as little data as possible to fulfill notification purposes as discussed herein. The header length 202 is a one byte (8 bit) field that indicates a length of the header portion of the heartbeat PDU 200. The header length may be expressed in 8-octet units or some other unit of data length or size.

Continuing with the example of FIG. 2, the header status 201 is a one byte (8 bit) field that indicates a status of the heartbeat signal. As shown by FIG. 2, the header status 201 includes 8 bits (labeled 0 to 7 in FIG. 2). In this example, bits 5-7 are used to indicate a signal type used to convey the heartbeat PDU 200, for example, to indicate that the signal is a heartbeat signal or some other type of signal. Bits 3-4 may be used for dummy bits, or reserved for some other purpose. Bit 2 is a "carry forward" bit, which indicates whether the signal (or information in the PDU 200) should be carried forward or not. According to various embodiments, a device that receives the heartbeat PDU 200 with this bit set will record the information in the message body 203 (e.g., a UUID) and carry that information forward to a nearby service provider (e.g., AN node 111a in the example of FIG. 1). Bit 1 is a "validity" bit, which is used for a validity check or authentication procedure. Bit 0 is an acknowledgement (ACK) bit, which indicates successful receipt or proper decoding of a heartbeat signal. Once a service provider (e.g., AN node 111a in the example of FIG. 1) receives a heartbeat PDU 200 from a covered device, the service provider can generate a heartbeat PDU 200 with a set ACK bit to acknowledge reception and/or proper decoding of the heartbeat PDU 200 from the covered device.

In an example where the heartbeat PDU 200 is broadcasted by an uncovered device (e.g., UE 101c in the example of FIG. 1), the body 203 may include a UUID of the uncovered device, bits 5-7 in the header status 201 may include a value to indicate that the signal is a heartbeat signal (e.g., a value of "101"); bits 3-4 in the header status 201 may include dummy bits (e.g., a value of "00"); bit 2 in the header status 201 may include a value to indicate that the heartbeat signal should be carried forward to an AN node 111 (e.g., a value of "1"); bit 1 in the header status 201 may include a value to be used for a validity check (e.g., a value of "1"); and bit 0 in the header status 201 may include a value to indicate that the heartbeat PDU 200 is not an ACK message (e.g., a value of "0"). In this example, the header status 201 may have a value of "10100110." The device that is detecting the heartbeat signal with this heartbeat PDU 200 (e.g., UE 101a in the example of FIG. 1) may decode or otherwise extract the UUID in the message body 203 and store the UUID in association with the carry forward indicator in a suitable memory device or system (e.g., a local cache or the like). This device may also perform a validity check procedure based on the value included in the validity check field (bit 1 of the header status 201).

Continuing with this example, the covered device (e.g., UE 101a in the example of FIG. 1) that received the previous heartbeat signal, may generate a heartbeat PDU 200 with a body 203 including at least the stored UUID of the uncovered device (e.g., UE 101c in the example of FIG. 1), but may also include the UUID of the covered device; bits 5-7 in the header status 201 may include a value to indicate that the signal is a heartbeat signal (e.g., a value of "101"); bits 3-4 in the header status 201 may include dummy bits (e.g., a value of "00"), bit 2 in the header status 201 may include a value to indicate that the heartbeat signal should not be carried forward to an AN node 111 (e.g., a value of "0") since this heartbeat PDU 200 may be intended for receipt by an AN node 111 (e.g., AN node 111a in the example of FIG. 1); bit 1 in the header status 201 may include a value to be used for a validity check (e.g., a value of "1"); and bit 0 in the header status 201 may include a value to indicate that the heartbeat PDU 200 is not an ACK message (e.g., a value of "0"). In this example, the header status 201 may have a value of "10100010." The device that is detecting the heartbeat signal with this heartbeat PDU 200 (e.g., AN node 111a in the example of FIG. 1) may decode or otherwise extract the UUIDs in the message body 203 and store the UUIDs in association in a suitable memory device or system. This device may also perform a validity check procedure based on the value included in the validity check field (bit 1 of the header status 201), and may also initiate procedures to predict a roaming area 115 of the uncovered device and adjust network service parameters to discover the uncovered device.

Another example may be the same as the previous example except that the covered device (e.g., UE 101a in the example of FIG. 1) that received the heartbeat signal from the uncovered device (e.g., UE 101c in the example of FIG. 1) may generate a heartbeat PDU 200 with a body 203 including only the stored UUID of the uncovered device (e.g., UE 101c in the example of FIG. 1); and instead of bits 3-4 being dummy bits, bits 3-4 may include a value to indicate that this heartbeat PDU 200 is used for the purpose of relaying or carrying forward heartbeat information of an uncovered device (e.g., a value of "11"). In this example, the header status 201 may have a value of "10111010."

Continuing with the previous examples, the AN node 111 (e.g., AN node 111a in the example of FIG. 1) that received either of the previous heartbeat signals may generate a heartbeat PDU 200 including an empty body 203; bits 5-7 in the header status 201 may include a value to indicate that the signal is a heartbeat signal (e.g., a value of "101"); bits 3-4 in the header status 201 may include dummy bits (e.g., a value of "00"), bit 2 in the header status 201 may include a value to indicate that the heartbeat signal should not be carried forward to an AN node 111 (e.g., a value of "0") since this heartbeat PDU 200 is intended to be an ACK message; bit 1 in the header status 201 may include a value to be used for a validity check (e.g., a value of "1"); and bit 0 in the header status 201 may include a value to indicate that the heartbeat PDU 200 is an ACK message (e.g., a value of "1"). In this example, the header status 201 may have a value of "10100011." The device that is detecting the heartbeat signal with this heartbeat PDU 200 (e.g., UE 101*a* in the example of FIG. 1) may decode the message, identify the set ACK bit, and flushes its local memory to remove or discard the information carried in the heartbeat PDU 200 of the uncovered device (e.g., UE 101*c* in the example of FIG. 1). In this way, the covered device can detect and obtain heartbeat PDUs 200 of other uncovered devices it encounters. This device may also perform a validity check procedure based on the value included in the validity check field (bit 1 of the header status 201).

Figure 3:
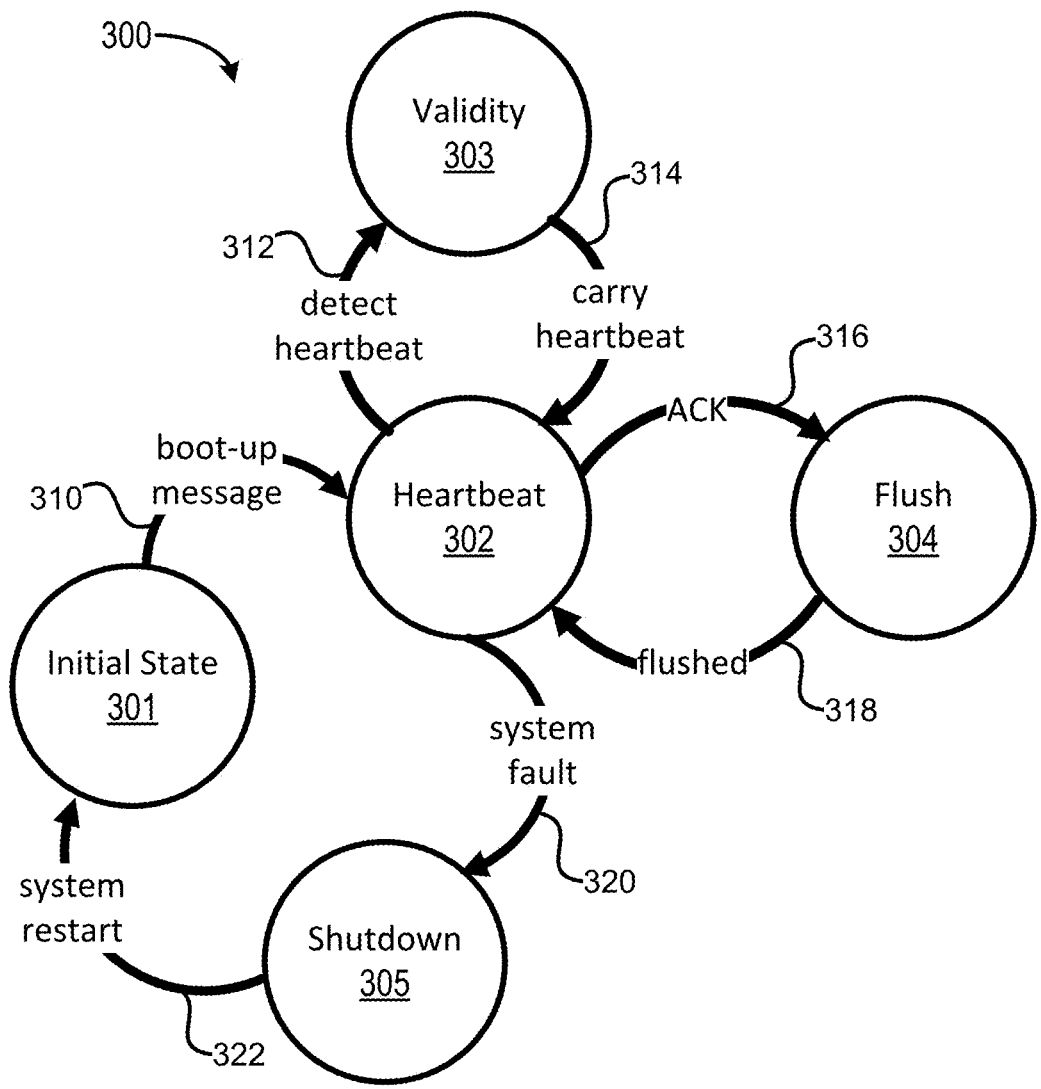
FIG. 3 illustrates an example heartbeat state machine according to various embodiments.

Referring now to FIG. 3, where an example heartbeat state machine 300 according to various embodiments, is shown. The heartbeat state machine 300 shows a number of states that a device (such as those shown and described with regard to FIG. 1) may be operating under at a given time. A state is a description of the status of the device that is waiting to execute a transition. A transition is a set of actions to be executed when a condition is fulfilled or when an event is detected, which may be based, for example, on one or more inputs. The state machine 300 allows each device (e.g., UEs 101 of FIG. 1) can contribute to service resource management and scalable discovery of peer devices.

Turning to FIG. 3, the device starts in the initial state 301, and boots (transitions) into the heartbeat state 302 based on boot-up message at transition 310. In the heartbeat state 302, the device generates a heartbeat PDU 200, and broadcasts a heartbeat signal with the heartbeat PDU 200 at a predefined interval. While the device is in the heartbeat state 302, the device may detect a system fault at transition 320, which causes the device to enter the shutdown state 305 and may then perform a system restart at transition 322 to re-enter the initial state 301. The system fault at transition 320 may be based on expiration of a timer due to lack of receipt of a heartbeat signal from another device, or may be based on some other event, such as a hardware or software failure or error, or the like.

Upon detecting another heartbeat signal at transition 312, the device enters the validity state 303 where the device checks the validity of the received heartbeat signal and determines whether to carry the received heartbeat signal to a service provider or not. The device re-enters the heartbeat state 302 at transition 314 based on the validity check. If the device in the validity state 303 determines that it should not carry the received heartbeat signal to a service provider, then the device back in the heartbeat state 302 may continue to generate and broadcast heartbeat signals according to normal operation. If the device in the validity state 303 determines that it should carry the received heartbeat signal to a service provider, then the device in the heartbeat state 302 may store the heartbeat information in the received heartbeat signal, generate another heartbeat PDU 200 including the heartbeat information from the received heartbeat signal, and broadcasts or otherwise transmits another heartbeat signal with the other heartbeat PDU 200 to a service provider or AN node 111.

In response to receipt of an ACK message from the service provider or AN node 111 at transition 316, the device enters a flush state 304 where the device clears out the stored heartbeat information obtained from the received heartbeat signal. Once the memory has been flushed at transition 318, the device re-enters the heartbeat state 302 where the device may operate as discussed previously.

FIGS. 4-7 shows example processes 400-700, respectively, in accordance with various embodiments. For illustrative purposes, the various operations of processes 400-700 is described as being performed by various devices discussed with regard to FIGS. 1-3. While particular examples and orders of operations are illustrated FIGS. 4-7, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

Figure 4:
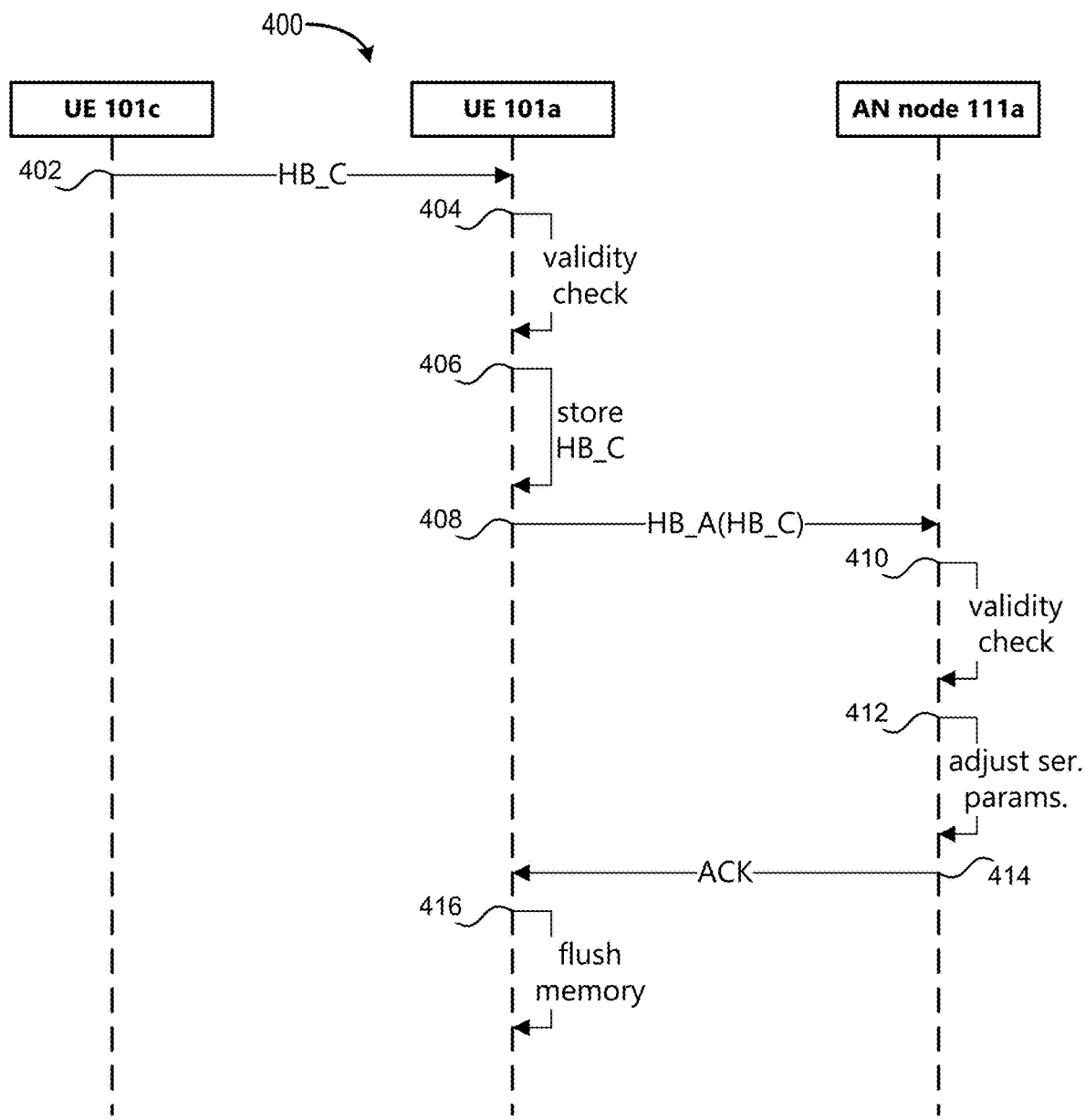
FIGS. 4-7 show example processes for practicing the embodiments discussed herein. In particular.

FIG. 4 shows heartbeat signaling procedure 400 according to various embodiments. Procedure 400 is used to carry heartbeat information from an uncovered UE 101*c* to an AN node 111*a* via a covered UE 101*a*. Procedure 400 begins at operation 402 where the uncovered UE 101*c* generates and broadcasts a heartbeat signal C (HB_C), which is detected by the UE 101*a*. At operation 404, the UE 101*a* performs a validity check on the HB_C, and if the validity check is successful, the UE 101*a* extracts and stores the heartbeat information included in HB_C at operation 406.

At operation 408, the UE 101*a* generates and broadcasts a heartbeat signal A (HB_A) that includes the heartbeat information of HB_C. HB_A is detected and received by the AN node 111*a*. Operation 408 may be performed when the UE 101*a* enters a coverage area of the AN node 111*a*. At operation 410, the AN node 111*a* performs a validity check based on the HB, and at operation 412, the AN node 111*a* adjusts service parameters to facilitate discovery of UE 101*c*. As examples, the service parameters may include, inter alia, antenna tilt, antenna azimuth, downlink transmit power, cell size and/or capacity, cell shape, etc. At operation 414, the AN node 111*a* generates and transmits/broadcasts an ACK message, which is received by the UE 101*a*. Based on receipt of the ACK message, the UE 101*a* flushes the heartbeat information included in HB_C from its memory at operation 416. After operation 416, procedure 400 may end or repeat as necessary.

Figure 5:
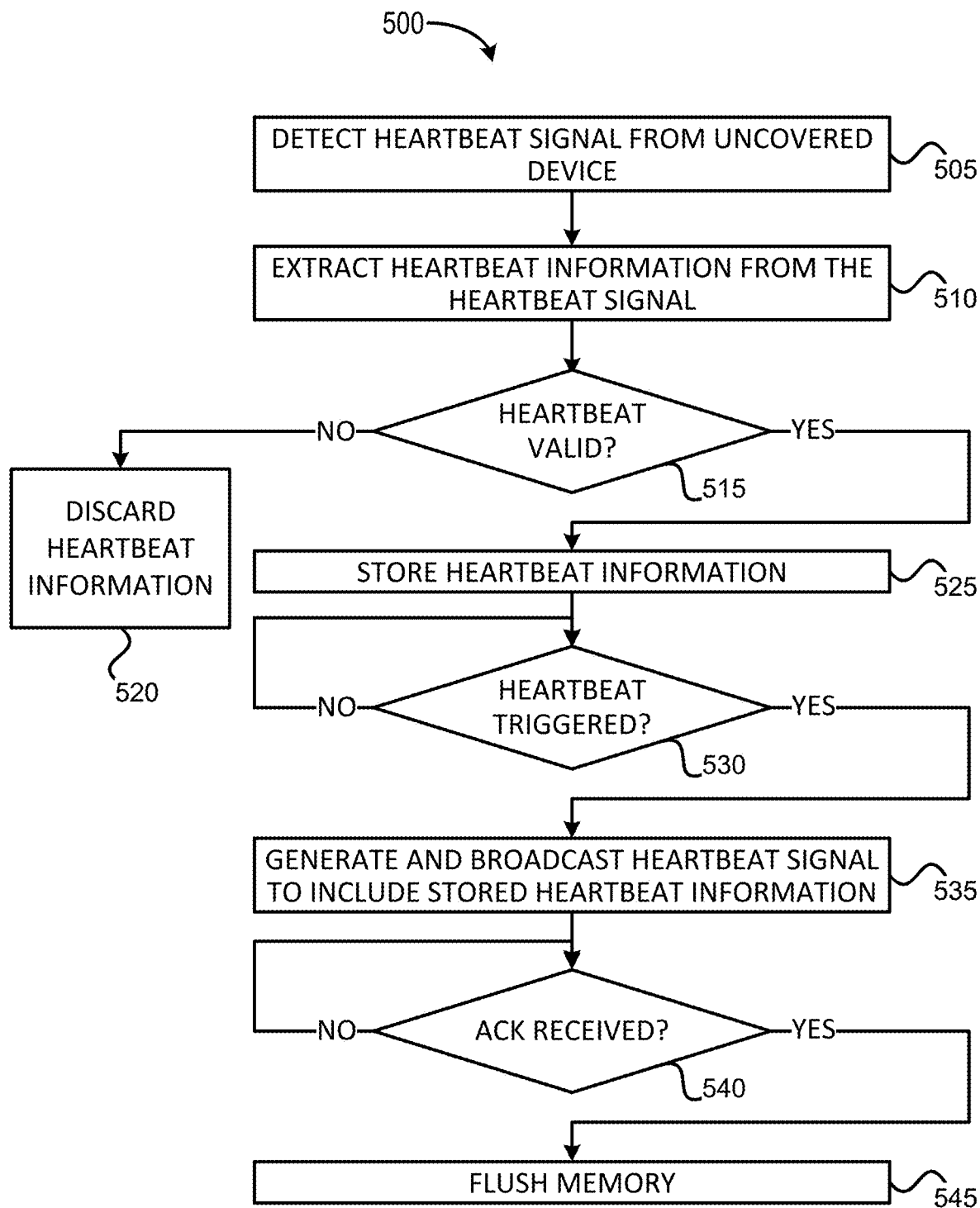

FIG. 5 shows a heartbeat signaling procedure 500 to be performed by a covered device (e.g., UE 101*a* in the example of FIG. 1). Process 500 begins at operation 505 where the covered device detects and receives a heartbeat signal from an uncovered device. At operation 510, the covered device extracts heartbeat information from the heartbeat signal, and at operation 515, the covered device performs a validity check on the heartbeat information. If at operation 515 the covered device determines that the heartbeat information is not valid, the covered device discards the heartbeat information at operation 520. If at operation 515 the covered device determines that the heartbeat information is valid, the covered device stores the heartbeat information in a local memory at operation 525.

At operation 530, the covered device determines whether a heartbeat trigger has been triggered, which may be, for example, expiration of a heartbeat time or detecting occurrence of a predefined event. The predefined event may be, for example, detecting proximity of another device or entering a service coverage area of an access network node. If at operation 530 the covered device determines that the heartbeat has not been triggered, the covered device loops back to operation 530 to monitor for the heartbeat trigger. If at operation 530 the covered device determines that the heartbeat has been triggered, the covered device proceeds to operation 535 to generate and broadcast a heartbeat signal that at least includes the stored heartbeat information from the heartbeat signal received at operation 505. In some embodiments, the heartbeat signal generated and broadcast at operation 535 may also include heartbeat information of the covered device.

At operation 540, the covered device determines whether an acknowledgement (ACK) message has been received based on the heartbeat signal broadcast at operation 535. If at operation 540 the covered device determines that the ACK message has not been received, the covered device loops back to operation 540 to monitor for the ACK message. If at operation 540 the covered device determines that the ACK message has been received, the covered device proceeds to operation 545 to flush the stored heartbeat information of the uncovered device from its local memory. After performance of operation 545, procedure 500 may end or repeat as necessary.

Figure 6:
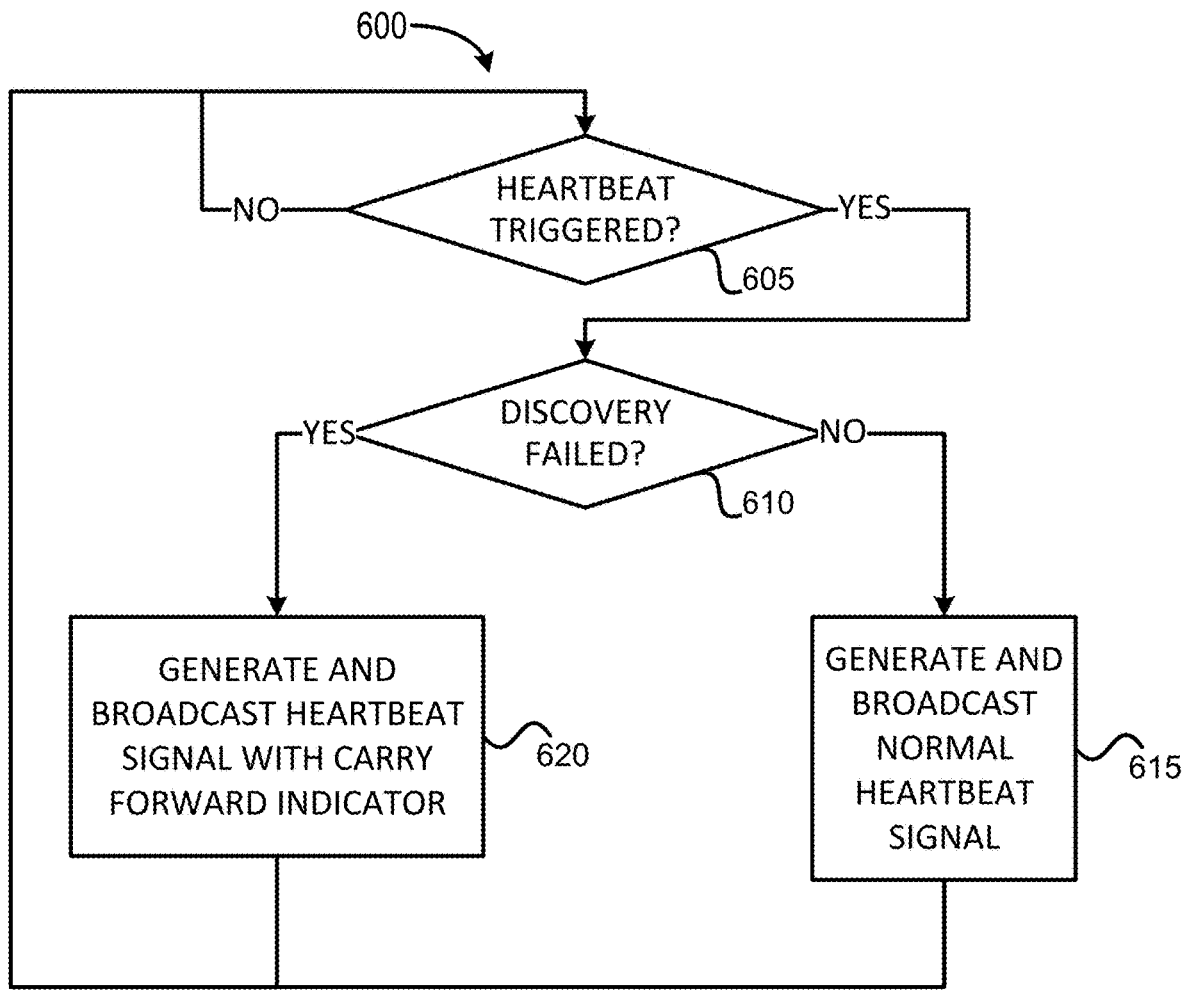

FIG. 6 shows a heartbeat signaling procedure 600 to be performed by an uncovered device (e.g., UE 101c in the example of FIG. 1). Process 600 starts at operation 605, where the uncovered device determines whether a heartbeat trigger has been triggered, which may be, for example, expiration of a heartbeat time or detecting occurrence of a predefined event. The predefined event may be, for example, detecting proximity of another device or failing to discovery or detect an access network node. If at operation 605 the uncovered device determines that the heartbeat has not been triggered, the uncovered device loops back to operation 605 to monitor for the heartbeat trigger. If at operation 605 the uncovered device determines that the heartbeat has been triggered, the uncovered device proceeds to operation 610 to determine if a discovery procedure has failed. If at operation 610 the uncovered device determines that the discovery procedure has not failed, the uncovered device proceeds to operation 615 to generate and broadcast a normal heartbeat signal according to a suitable communication protocol or application. If at operation 610 the uncovered device determines that the discovery procedure has failed, the uncovered device proceeds to operation 620 to generate and broadcast a heartbeat signal that includes a carry forward indicator. In embodiments, a proximate device may store heartbeat information included in the heartbeat signal upon receipt of the heartbeat signal based in part on the carry forward indicator included in the heartbeat signal. After performance of operation 615 or 620, process 600 may repeat as necessary.

Figure 7:
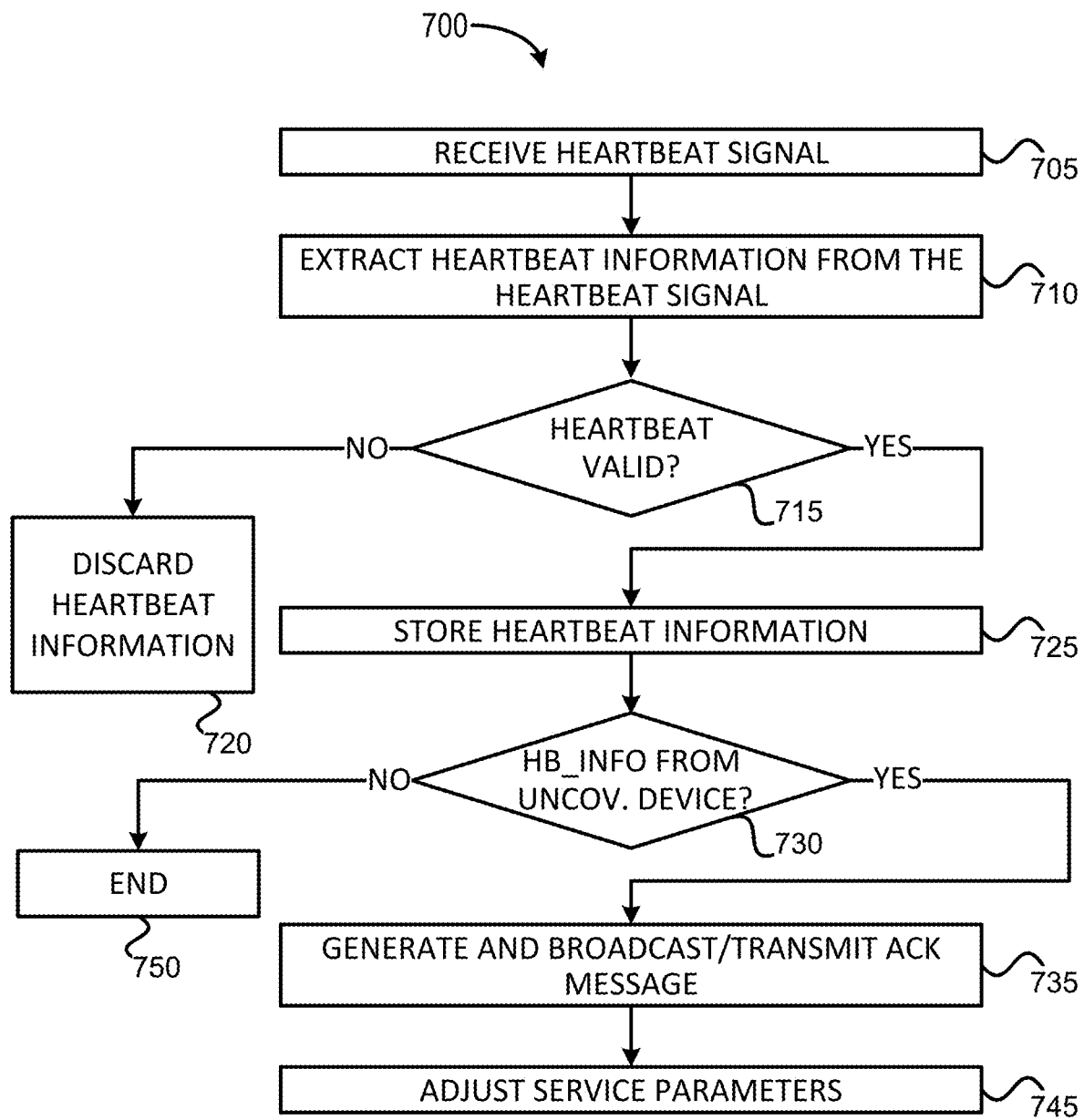

FIG. 7 shows a heartbeat signaling procedure 700 to be performed by a service provider (e.g., AN node 111a in the example of FIG. 1). Process 700 begins at operation 705 where the service provider receives a heartbeat signal. At operation 710, the service provider extracts heartbeat information from the heartbeat signal, and at operation 715, the service provider performs a validity check on the heartbeat information. If at operation 715 the service provider determines that the heartbeat information is not valid, the covered device discards the heartbeat information at operation 720. If at operation 715 the service provider determines that the heartbeat information is valid, the service provider stores the heartbeat information in a local memory at operation 725.

At operation 730, the service provider determines whether a heartbeat information includes information of an uncovered device. Operation 730 may include checking a UUID included in the heartbeat information with previously stored UUIDs of devices currently being served by the service provider. If at operation 730 the service provider determines that the heartbeat information is not associated with an uncovered device, the service provider proceeds to operation 750 to end process 700 or to perform some other action(s). If at operation 730 the service provider determines that the heartbeat information is associated with an uncovered device, the service provider proceeds to operation 735 to generate and broadcast an acknowledgement (ACK) message for the device that sent the heartbeat signal at operation 705. In some embodiments, the ACK message may cause the covered device that sent the heartbeat signal at operation 705 to flush stored heartbeat information of the uncovered device from its local memory. At operation 745, the service provider alters or adjust one or more service parameters to facilitate discovery of the uncovered device associated with the heartbeat information. After performance of operation 745, procedure 700 may end or repeat as necessary

II. EXAMPLE IMPLEMENTATIONS

Figure 8:
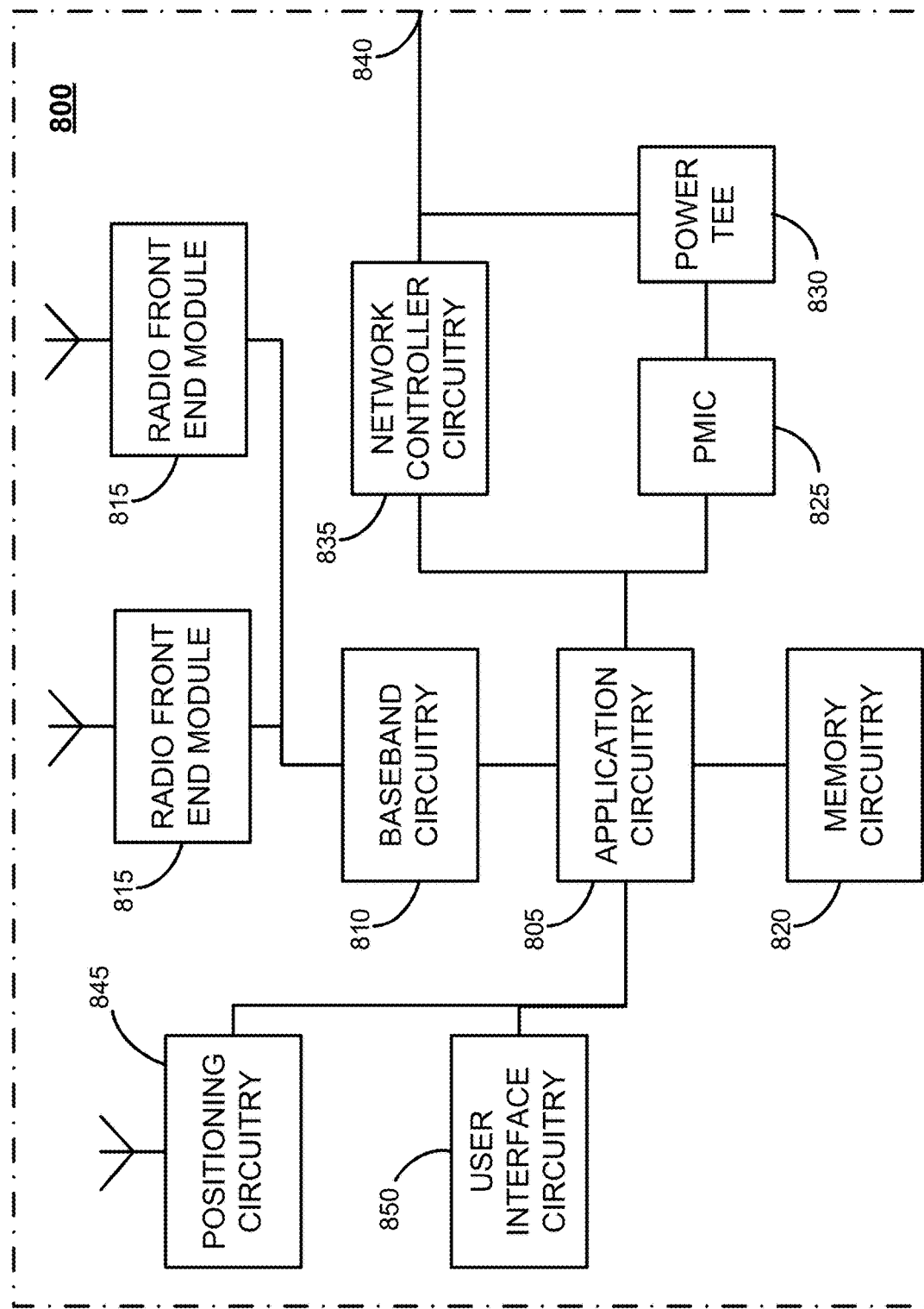
FIG. 8 illustrates an example implementation of infrastructure equipment in accordance with various embodiments.

FIG. 8 illustrates an example of infrastructure equipment 800 in accordance with various embodiments. The infrastructure equipment 800 (or "system 800") may be a service provider system including a base station, radio head, RAN node or AP such as an AN node 111 of FIG. 1-7, server(s) 130, and/or any other element/device discussed herein. In other examples, the system 800 could be implemented in or by a UE 101.

The system 800 includes application circuitry 805, baseband circuitry 810, one or more radio front end modules (RFEMs) 815, memory circuitry 820, power management integrated circuitry (PMIC) 825, power tee circuitry 830, network controller circuitry 835, network interface connector 840, positioning circuitry 845, and user interface 850. In some embodiments, the device 700 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 805 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 805 may be coupled with or may include memory/storage elements and may be configured to execute instructions stored in the memory/storage to enable various applications or operating systems to run on the system 800. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 805 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 805 may comprise, or may be, a special-purpose processor/controller to operate according to the various embodiments herein. As examples, the processor(s) of application circuitry 805 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 800 may not utilize application circuitry 805, and instead may include a special-purpose processor/controller to process IP data received from an EPC or SGC, for example.

In some implementations, the application circuitry 805 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 805 may comprise logic blocks or logic fabric, and other interconnected resources that may be programmed to perform various functions, such as the procedures, methods, functions, etc. of the various embodiments discussed herein. In such embodiments, the circuitry of application circuitry 805 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

In some implementations, such as implementations where the AN nodes 111 utilize individual software agents or AI agents to determine a roaming range 115 of uncovered devices and/or to determine the service parameters to be adjusted to facilitate discovery of the uncovered devices, each agent is implemented in a respective hardware accelerator that are configured with appropriate bit stream(s) or logic blocks to perform their respective functions. In these implementations, processor(s) and/or hardware accelerators of the application circuitry 805 may be specifically tailored for operating the agents and/or for machine learning functionality, such as a cluster of AI GPUs, tensor processing units (TPUs) developed by Google® Inc., a Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the hardware accelerator may be implemented as an AI accelerating co-processor, such as the Hexagon 685 DSP provided by Qualcomm®, the PowerVR 2NX Neural Net Accelerator (NNA) provided by Imagination Technologies Limited®, the Neural Engine core within the Apple® 11 or 12 Bionic SoC, the Neural Processing Unit within the Hi Silicon Kirin 970 provided by Huawei®, and/or the like.

The baseband circuitry 810 may be implemented, for example, as a solder-down substrate including one or more integrated circuits, a single packaged integrated circuit soldered to a main circuit board or a multi-chip module containing two or more integrated circuits. The baseband circuitry 810 includes one or more processing devices (e.g., baseband processors) to carry out various protocol and radio control functions. Baseband circuitry 810 may interface with application circuitry of system 800 for generation and processing of baseband signals and for controlling operations of the RFEMs 815. The baseband circuitry 810 may handle various radio control functions that enable communication with one or more radio networks via the RFEMs 815. The baseband circuitry 810 may include circuitry such as, but not limited to, one or more single-core or multi-core processors (e.g., one or more baseband processors) or control logic to process baseband signals received from a receive signal path of the RFEMs 815, and to generate baseband signals to be provided to the RFEMs 815 via a transmit signal path. In various embodiments, the baseband circuitry 810 may implement a real-time OS (RTOS) to manage resources of the baseband circuitry 810, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 8, in one embodiment, the baseband circuitry 810 includes individual processing device(s) to operate one or more wireless communication protocols (e.g., a "multi-protocol baseband processor" or "protocol processing circuitry") and individual processing device(s) to implement physical layer (PHY) functions. In this embodiment, the protocol processing circuitry operates or implements various protocol layers/entities of one or more wireless communication protocols. In a first example, the protocol processing circuitry may operate Long Term Evolution (LTE) protocol entities and/or Fifth Generation (5G)/New Radio (NR) protocol entities when the RFEMs 815 are cellular radiofrequency communication system, such as millimeter wave (mmWave) communication circuitry or some other suitable cellular communication circuitry. In the first example, the protocol processing circuitry would operate medium access control (MAC), radio link control (RLC), packet data convergence protocol (PDCP), service data adaptation protocol (SDAP), radio resource control (RRC), and non-access stratum (NAS) functions. In a second example, the protocol processing circuitry may operate one or more IEEE-based protocols when the RFEMs 815 are WiFi communication system. In the second example, the protocol processing circuitry would operate WiFi MAC and logical link control (LLC) functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 810 and/or RFEMs 815. The baseband circuitry 810 may also support radio communications for more than one wireless protocol.

Continuing with the aforementioned embodiment, the baseband circuitry 810 includes individual processing device(s) to implement PHY including hybrid automatic repeat request (HARD) functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), precoding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

User interface circuitry 850 may include one or more user interfaces designed to enable user interaction with the system 800 or peripheral component interfaces designed to enable peripheral component interaction with the system 800. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 815 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 815, which incorporates both mmWave antennas and sub-mmWave. The antenna array comprises one or more antenna elements, each of which is configured convert electrical signals into radio waves to travel through the air and to convert received radio waves into electrical signals. For example, digital baseband signals provided by the baseband circuitry 810 is converted into analog RF signals (e.g., modulated waveform) that will be amplified and transmitted via the antenna elements of the antenna array including one or more antenna elements (not shown). The antenna elements may be omnidirectional, direction, or a combination thereof. The antenna elements may be formed in a multitude of arranges as are known and/or discussed herein. The antenna array may comprise microstrip antennas or printed antennas that are fabricated on the surface of one or more printed circuit boards. The antenna array may be formed in as a patch of metal foil (e.g., a patch antenna) in a variety of shapes, and may be coupled with the RF circuitry XT106 and/or FEM circuitry XT108 using metal transmission lines or the like.

The memory circuitry 820 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 820 may be implemented as one or more of solder down packaged integrated circuits, socketed memory modules and plug-in memory cards. The memory circuitry 820 is configured to store computational logic (or "modules") in the form of software, firmware, or hardware commands to implement the techniques described herein. The computational logic or modules may be developed using a suitable programming language or development tools, such as any programming language or development tool discussed herein. The computational logic may be employed to store working copies and/or permanent copies of programming instructions for the operation of various components of appliance infrastructure equipment 800, an operating system of infrastructure equipment 800, one or more applications, and/or for carrying out the embodiments discussed herein (such as one or more operations of depicted by FIGS. 4-6 and/or discussed with regard to FIG. 3). The computational logic may be stored or loaded into memory circuitry 820 as instructions for execution by the processors of the application circuitry 805 to provide or perform the functions described herein. The various elements may be implemented by assembler instructions supported by processors of the application circuitry 805 or high-level languages that may be compiled into such instructions. The permanent copy of the programming instructions may be placed into persistent storage devices of memory circuitry 820 in the factory during manufacture, or in the field through, for example, a distribution medium (not shown), through a communication interface (e.g., from a distribution server), and/or over-the-air (OTA).

The PMIC 825 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 830 may provide for electrical power drawn from a network cable to provide both power supply and data connectivity to the infrastructure equipment 800 using a single cable.

The network controller circuitry 835 provides connectivity to a network using a standard network interface protocol such as Ethernet, Ethernet over GRE Tunnels, Ethernet over Multiprotocol Label Switching (MPLS), or some other suitable protocol, such as those discussed herein. Network connectivity may be provided to/from the infrastructure equipment 800 via network interface connector 840 using a physical connection, which may be electrical (commonly referred to as a "copper interconnect"), optical, or wireless. The network controller circuitry 835 may include one or more dedicated processors and/or FPGAs to communicate using one or more of the aforementioned protocols. In some implementations, the network controller circuitry 835 may include multiple controllers to provide connectivity to other networks using the same or different protocols. In various embodiments, the network controller circuitry 835 enables communication with associated equipment (e.g., individual remote sensors 822 and/or actuators) and/or with a backend system (e.g., server(s) 130 of FIG. 2), which may take place via a suitable gateway device.

The positioning circuitry 845 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 845 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 845 may include a Micro-Technology for Positioning, Navigation, and Timing (Micro-PNT) IC that uses a master timing clock to perform position tracking/estimation without GNSS assistance. The positioning circuitry 845 may also be part of, or interact with, the baseband circuitry 810 and/or RFEMs 815 to communicate with the nodes and components of the positioning network. The positioning circuitry 845 may also provide position data and/or time data to the application circuitry 805, which may use the data to synchronize operations with various other infrastructure equipment, or the like.

The components shown by FIG. 8 may communicate with one another using interface circuitry, which may include any number of bus and/or interconnect (IX) technologies such as industry standard architecture (ISA), extended ISA (EISA), inter-integrated circuit ($I^2C$), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Common Application Programming Interface (CAPI), Intel® QuickPath interconnect (QPI), Ultra Path Interconnect (UPI), Intel® Omni-Path Architecture (OPA) IX, RapidIO™ system IXs, Cache Coherent Interconnect for Accelerators (CCIA), Gen-Z Consortium IXs, Open Coherent Accelerator Processor Interface (OpenCAPI) IX, a HyperTransport interconnect, and/or any number of other IX technologies. The IX technology may be a proprietary bus, for example, used in an SoC based system.

Figure 9:
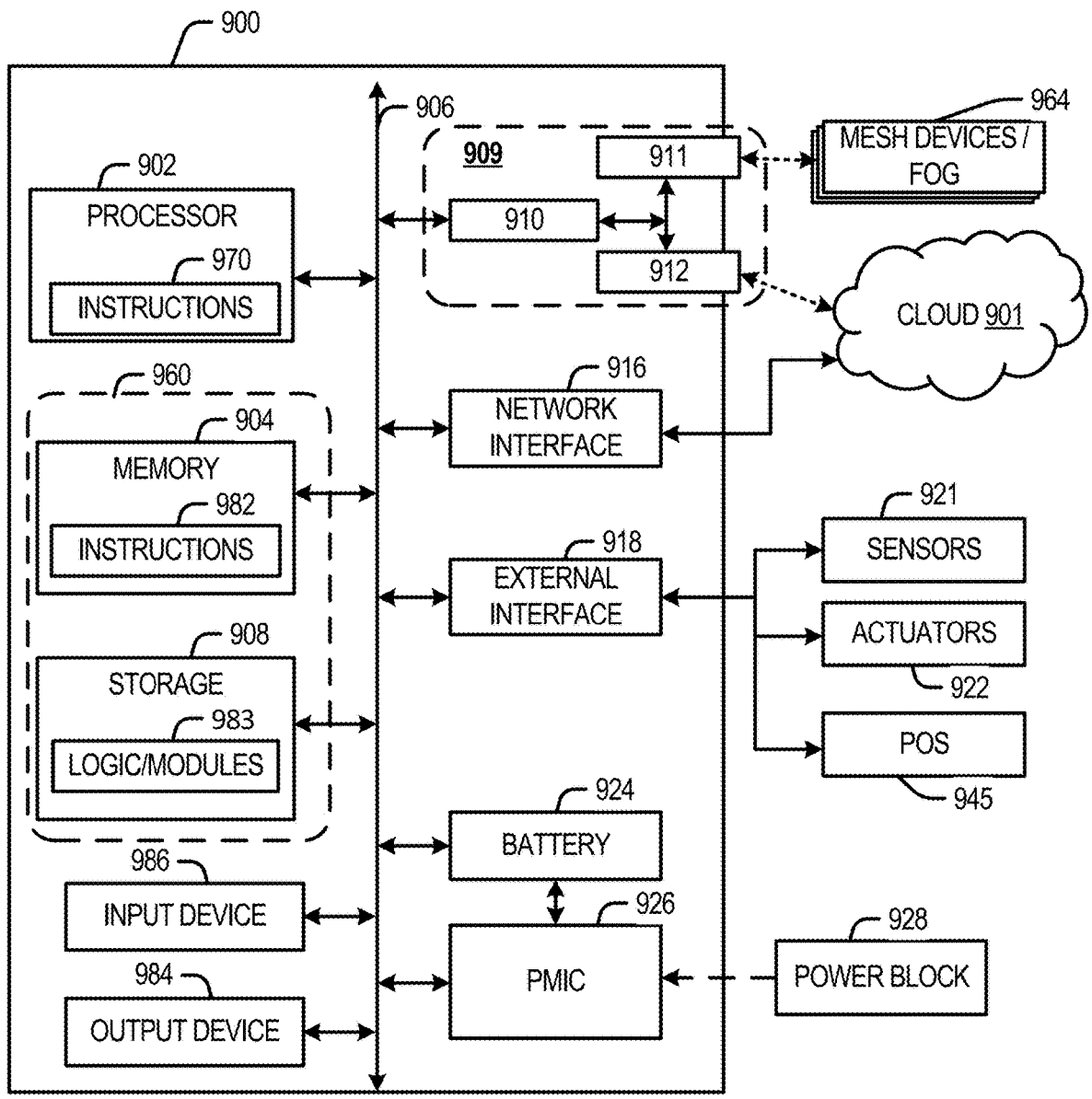
FIG. 9 illustrates an example implementation of a computing architecture, in accordance with various embodiments.

FIG. 9 illustrates an example of an platform 900 (also referred to as "system 900," "device 900," "appliance 900," or the like) in accordance with various embodiments. The platform 900 may be suitable for use as any of the computer devices discussed herein, such as the UEs 101, or some other system/device discussed herein. Platform 900 may also be implemented in or as a server computer system or some other element, device, or system discussed herein. The platform 900 may include any combinations of the components shown in the example. The components of platform 900 may be implemented as integrated circuits (ICs), portions thereof, discrete electronic devices, or other modules, logic, hardware, software, firmware, or a combination thereof adapted in the computer platform 900, or as components otherwise incorporated within a chassis of a larger system. The example of FIG. 9 is intended to show a high level view of components of the computer platform 900. However, some of the components shown may be omitted, additional components may be present, and different arrangement of the components shown may occur in other implementations.

The platform 900 includes processor circuitry 902. The processor circuitry 902 includes circuitry such as, but not limited to one or more processor cores and one or more of cache memory, low drop-out voltage regulators (LDOs), interrupt controllers, serial interfaces such as serial peripheral interface (SPI), inter-integrated circuit ($I^2C$) or universal programmable serial interface circuit, real time clock (RTC), timer-counters including interval and watchdog timers, general purpose input-output (I/O), memory card controllers such as secure digital/multi-media card (SD/MMC) or similar, universal serial bus (USB) interfaces, mobile industry processor interface (MIPI) interfaces and Joint Test Access Group (JTAG) test access ports. In some implementations, the processor circuitry 902 may include one or more hardware accelerators, which may be microprocessors, programmable processing devices (e.g., FPGA, ASIC, etc.), or the like. The one or more hardware accelerators may include, for example, computer vision (CV) and/or deep learning (DL) accelerators. In some implementations, the processor circuitry 902 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of processor circuitry 902 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more baseband processors, one or more radio-frequency integrated circuits (RFIC), one or more microprocessors or controllers, or any suitable combination thereof. The processors (or cores) of the processor circuitry 902 may be coupled with or may include memory/storage and may be configured to execute instructions stored in the memory/storage to enable various applications or operating systems to run on the platform 900. In these embodiments, the processors (or cores) of the processor circuitry 902 is configured to operate application software to provide a specific service to a user of the platform 900. In some embodiments, the processor circuitry 902 may be a special-purpose processor/controller to operate according to the various embodiments herein.

As examples, the processor circuitry 902 may include an Intel® Architecture Core™ based processor, such as a Quark™, an Atom™, an i3, an i5, an i7, or an MCU-class processor, Pentium® processor(s), Xeon® processor(s), or another such processor available from Intel® Corporation, Santa Clara, Calif. However, any number other processors may be used, such as one or more of Advanced Micro Devices (AMD) Zen® Core Architecture, such as Ryzen® or EPYC® processor(s), Accelerated Processing Units (APUs), MxGPUs, Epyc® processor(s), or the like; A5-12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor circuitry 902 may be a part of a system on a chip (SoC), System-in-Package (SiP), a multi-chip package (MCP), and/or the like, in which the processor circuitry 902 and other components are formed into a single integrated circuit, or a single package, such as the Edison™ or Galileo™ SoC boards from Intel® Corporation. Other examples of the processor circuitry 902 are mentioned elsewhere in the present disclosure.

Additionally or alternatively, processor circuitry 902 may include circuitry such as, but not limited to, one or more FPDs such as FPGAs and the like; PLDs such as CPLDs, HCPLDs, and the like; ASICs such as structured ASICs and the like; PSoCs; and the like. In such embodiments, the circuitry of processor circuitry 902 may comprise logic blocks or logic fabric including and other interconnected resources that may be programmed to perform various functions, such as the procedures, methods, functions, etc. of the various embodiments discussed herein. In such embodiments, the circuitry of processor circuitry 902 may include memory cells (e.g., EPROM, EEPROM, flash memory, static memory (e.g., SRAM, anti-fuses, etc.) used to store logic blocks, logic fabric, data, etc. in LUTs and the like.

The processor circuitry 902 may communicate with system memory circuitry 905 over an interconnect 806 (e.g., a bus). Any number of memory devices may be used to provide for a given amount of system memory. As examples, the memory circuitry 905 may be random access memory (RAM) in accordance with a Joint Electron Devices Engineering Council (JEDEC) design such as the DDR or mobile DDR standards (e.g., LPDDR, LPDDR2, LPDDR3, or LPDDR4), dynamic RAM (DRAM), and/or synchronous DRAM (SDRAM)). The memory circuitry 905 may also include nonvolatile memory (NVM) such as high-speed electrically erasable memory (commonly referred to as "flash memory"), phase change RAM (PRAM), resistive memory such as magnetoresistive random access memory (MRAM), etc., and may incorporate three-dimensional (3D) cross-point (XPOINT) memories from Intel® and Micron®. The memory circuitry 905 may also comprise persistent storage devices, which may be temporal and/or persistent storage of any type, including, but not limited to, non-volatile memory, optical, magnetic, and/or solid state mass storage, and so forth.

The individual memory devices of memory circuitry 905 may be implemented as one or more of solder down packaged integrated circuits, socketed memory modules, and plug-in memory cards. The memory circuitry 905 may be implemented as any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. Memory circuitry 905. In embodiments, the memory circuitry 905 may be disposed in or on a same die or package as the processor circuitry 902 (e.g., a same SoC, a same SiP, or soldered on a same MCP as the processor circuitry 902).

To provide for persistent storage of information such as data, applications, operating systems (OS), and so forth, a storage circuitry 908 may also couple to the processor circuitry 902 via the interconnect 806. In an example, the storage circuitry 908 may be implemented via a solid-state disk drive (SSDD). Other devices that may be used for the storage circuitry 908 include flash memory cards, such as SD cards, microSD cards, xD picture cards, and the like, and USB flash drives. In low power implementations, the storage circuitry 908 may be on-die memory or registers associated with the processor circuitry 902. However, in some examples, the storage circuitry 908 may be implemented using a micro hard disk drive (HDD). Further, any number of new technologies may be used for the storage circuitry 908 in addition to, or instead of, the technologies described, such resistance change memories, phase change memories, holographic memories, or chemical memories, among others.

The storage circuitry 908 store computational logic 983 (or "modules 983") in the form of software, firmware, or hardware commands to implement the techniques described herein. The computational logic 983 may be employed to store working copies and/or permanent copies of programming instructions for the operation of various components of platform 900 (e.g., drivers, etc.), an operating system of platform 900, one or more applications, and/or for carrying out the embodiments discussed herein. The computational logic 983 may be stored or loaded into memory circuitry 905 as instructions 982 for execution by the processor circuitry 902 to provide the functions described herein. The various elements may be implemented by assembler instructions supported by processor circuitry 902 or high-level languages that may be compiled into such instructions (e.g., instructions 970). The permanent copy of the programming instructions may be placed into persistent storage devices of storage circuitry 908 in the factory or in the field through, for example, a distribution medium (not shown), through a communication interface (e.g., from a distribution server (not shown)), or over-the-air (OTA).

Although the instructions 982 are shown as code blocks included in the memory circuitry 905 and the computational logic 983 is shown as code blocks in the storage circuitry 908, it should be understood that any of the code blocks may be replaced with hardwired circuits, for example, built into an FPGA, ASIC, or some other suitable circuitry. For example, where processor circuitry 902 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The memory circuitry 905 and/or storage circuitry 908 may store program code of an operating system (OS), which may be a general purpose OS or an OS specifically written for and tailored to the computing platform 900. For example, the OS may be Unix or a Unix-like OS such as Linux e.g., provided by Red Hat Enterprise, Windows 10™ provided by Microsoft Corp.®, macOS provided by Apple Inc.®, or the like. In another example, the OS may be a mobile OS, such as Android® provided by Google iOS® provided by Apple Inc.®, Windows 10 Mobile® provided by Microsoft Corp.®, KaiOS provided by KaiOS Technologies Inc., or the like. In another example, the OS may be a real-time OS (RTOS), such as Apache Mynewt provided by the Apache Software Foundation®, Windows 10 For IoT® provided by Microsoft Corp.®, Micro-Controller Operating Systems ("MicroC/OS" or "µC/OS") provided by Micrium®, Inc., FreeRTOS, VxWorks® provided by Wind River Systems, Inc.®, PikeOS provided by Sysgo AG®, Android Things® provided by Google Inc.®, QNX® RTOS provided by BlackBerry Ltd., or any other suitable RTOS, such as those discussed herein.

The OS may include one or more drivers that operate to control particular devices that are embedded in the platform 900, attached to the platform 900, or otherwise communicatively coupled with the platform 900. The drivers may include individual drivers allowing other components of the platform 900 to interact or control various input/output (I/O) devices that may be present within, or connected to, the platform 900. For example, the drivers may include a display driver to control and allow access to a display device, a touchscreen driver to control and allow access to a touchscreen interface of the platform 900, sensor drivers to obtain sensor readings of sensor circuitry 921 and control and allow access to sensor circuitry 921, actuator drivers to obtain actuator positions of the actuators 922 and/or control and allow access to the actuators 922, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from a secure execution environment (SEE), trusted execution environment (TEE), and/or management engine of the platform 900 (not shown).

In an example, the instructions 982 provided via the memory circuitry 905 and/or the storage circuitry 908 are embodied as a non-transitory, machine-readable medium 960 including code to direct the processor circuitry 902 to perform electronic operations in the platform 900. The processor circuitry 902 accesses the non-transitory machine-readable medium 960 over the interconnect 806. For instance, the non-transitory, machine-readable medium 960 may be embodied by devices described for the storage circuitry 908 of FIG. 8 or may include specific storage units such as optical disks, flash drives, or any number of other hardware devices. The non-transitory, machine-readable medium 960 may include instructions 982 to direct the processor circuitry 902 to perform a specific sequence or flow of actions, for example, as described with respect to the flowchart(s) and block diagram(s) of operations and functionality depicted previously (see e.g., FIGS. 4-8). In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., EPROM, EEPROM) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP). In alternate embodiments, the programming instructions may be disposed on multiple computer-readable non-transitory storage media instead. In still other embodiments, the programming instructions may be disposed on computer-readable transitory storage media, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device. The computer-readable medium may include a propagated data signal with the computer-readable program code embodied therewith, either in baseband or as part of a carrier wave. The computer usable program code may be transmitted using any appropriate medium, including but not limited to wireless, wireline, optical fiber cable, RF, etc.

The computer program code for carrying out operations of the present disclosure (e.g., computational logic 983, instructions 982, 970, etc.) may be written in any combination of one or more programming languages, including an object oriented programming language such as Python, Ruby, Scala, Smalltalk, Java™, C++, C #, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP-.NET, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™ Apache® Thrift, Abstract Syntax Notation One (ASN.1), Google® Protocol Buffers (protobuf), or the like; some other suitable programming languages including proprietary programming languages and/or development tools, or any other languages tools as discussed herein. The computer program code for carrying out operations of the present disclosure may also be written in any combination of the programming languages discussed herein. The program code may execute entirely on the user's wearable device, partly on the user's wearable device, as a stand-alone software package, partly on the user's wearable device and partly on a remote computer or entirely on the remote computer or server. In the latter scenario, the remote computer may be connected to the user's wearable device through any type of network, including a local area network (LAN) or a wide area network (WAN), or the connection may be made to an external computer (for example, through the Internet using an Internet Service Provider).

The components may communicate over the interconnect 806. The interconnect 806 may include any number of technologies, including industry standard architecture (ISA), extended ISA (EISA), peripheral component interconnect (PCI), peripheral component interconnect extended (PCIx), PCI express (PCIe), or any number of other technologies. The interconnect 806 may be a proprietary bus, for example, used in a SoC based system. Other bus systems may be included, such as an I$^2$C interface, an SPI interface, point-to-point interfaces, and a power bus, among others.

The interconnect 806 couples the processor circuitry 902 to the communication circuitry 909 for communications with other devices. The communication circuitry 909 is a hardware element, or collection of hardware elements, used to communicate over one or more networks (e.g., cloud 901) and/or with other devices (e.g., mesh devices/fog 964). The communication circuitry 909 includes baseband circuitry 910 (or "modem 910") and radiofrequency (RF) circuitry 911 and 912.

The baseband circuitry 910 includes one or more processing devices (e.g., baseband processors) to carry out various protocol and radio control functions. Baseband circuitry 910 may interface with application circuitry of platform 900 (e.g., a combination of processor circuitry 902 and CRM 960) for generation and processing of baseband signals and for controlling operations of the RF circuitry 911 or 912. The baseband circuitry 910 may handle various radio control functions that enable communication with one or more radio networks via the RF circuitry 911 or 912. The baseband circuitry 910 may include circuitry such as, but not limited to, one or more single-core or multi-core processors (e.g., one or more baseband processors) or control logic to process baseband signals received from a receive signal path of the RF circuitry 911 and/or 912, and to generate baseband signals to be provided to the RF circuitry 911 or 912 via a transmit signal path. In various embodiments, the baseband circuitry 910 may implement a real-time OS (RTOS) to manage resources of the baseband circuitry 910, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 9, in one embodiment, the baseband circuitry 910 includes individual processing device(s) to operate one or more wireless communication protocols (e.g., a "multi-protocol baseband processor" or "protocol processing circuitry") and individual processing device(s) to implement physical layer (PHY) functions. In this embodiment, the protocol processing circuitry operates or implements various protocol layers/entities of one or more wireless communication protocols. In a first example, the protocol processing circuitry may operate Long Term Evolution (LTE) protocol entities and/or Fifth Generation (5G)/New Radio (NR) protocol entities when the communication circuitry 909 is a cellular radiofrequency communication system, such as millimeter wave (mmWave) communication circuitry or some other suitable cellular communication circuitry. In the first example, the protocol processing circuitry 805 would operate medium access control (MAC), radio link control (RLC), packet data convergence protocol (PDCP), service data adaptation protocol (SDAP), radio resource control (RRC), and non-access stratum (NAS) functions. In a second example, the protocol processing circuitry may operate one or more IEEE-based protocols when the communication circuitry 909 is WiFi communication system. In the second example, the protocol processing circuitry would operate WiFi MAC and logical link control (LLC) functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 910 and/or RF circuitry 911 and 912. The baseband circuitry 910 may also support radio communications for more than one wireless protocol.

Continuing with the aforementioned embodiment, the baseband circuitry 910 includes individual processing device(s) to implement PHY including hybrid automatic repeat request (HARD) functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), precoding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

The communication circuitry 909 also includes RF circuitry 911 and 912 to enable communication with wireless networks using modulated electromagnetic radiation through a non-solid medium. Each of the RF circuitry 911 and 912 include a receive signal path, which may include circuitry to convert analog RF signals (e.g., an existing or received modulated waveform) into digital baseband signals to be provided to the baseband circuitry 910. Each of the RF circuitry 911 and 912 also include a transmit signal path, which may include circuitry configured to convert digital baseband signals provided by the baseband circuitry 910 to be converted into analog RF signals (e.g., modulated waveform) that will be amplified and transmitted via an antenna array including one or more antenna elements (not shown). The antenna array may be a plurality of microstrip antennas or printed antennas that are fabricated on the surface of one or more printed circuit boards. The antenna array may be formed in as a patch of metal foil (e.g., a patch antenna) in a variety of shapes, and may be coupled with the RF circuitry 911 or 912 using metal transmission lines or the like.

The RF circuitry 911 (also referred to as a "mesh transceiver") is used for communications with other mesh or fog devices 964. The mesh transceiver 911 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of RF circuitry 911, configured for a particular wireless communication protocol, may be used for the connections to the mesh devices 964. For example, a WLAN unit may be used to implement Wi-Fi™ communications in accordance with the IEEE 802.11 standard. In addition, wireless wide area communications, for example, according to a cellular or other wireless wide area protocol, may occur via a WWAN unit.

The mesh transceiver 911 may communicate using multiple standards or radios for communications at different ranges. For example, the platform 900 may communicate with close/proximate devices, e.g., within about 10 meters, using a local transceiver based on BLE, or another low power radio, to save power. More distant mesh devices 964, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

The RF circuitry 912 (also referred to as a "wireless network transceiver," a "cloud transceiver," or the like) may be included to communicate with devices or services in the cloud 901 via local or wide area network protocols. The wireless network transceiver 912 includes one or more radios to communicate with devices in the cloud 901. The cloud 901 may be the same or similar to cloud 1201 and 1302 discussed infra. The wireless network transceiver 912 may be a LPWA transceiver that follows the IEEE 802.15.4, or IEEE 802.15.4g standards, among others, such as those discussed herein. The platform 900 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 911 and wireless network transceiver 912, as described herein. For example, the radio transceivers 911 and 912 may include an LTE or other cellular transceiver that uses spread spectrum (SPA/SAS) communications for implementing high-speed communications. Further, any number of other protocols may be used, such as Wi-Fi® networks for medium speed communications and provision of network communications.

The transceivers 911 and 912 may include radios that are compatible with, and/or may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDM2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDM2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) V2X communication technologies, 3GPP cellular V2X, DSRC (Dedicated Short Range Communications) communication systems such as Intelligent-Transport-Systems and others, the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), etc. In addition to the standards listed above, any number of satellite uplink technologies may be used for the transceivers 911, 912 including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

Network interface circuitry/controller (NIC) 916 may be included to provide wired communication to the cloud 901 or to other devices, such as the mesh devices 964 using a standard network interface protocol. The standard network interface protocol may include Ethernet, Ethernet over GRE Tunnels, Ethernet over Multiprotocol Label Switching (MPLS), Ethernet over USB, or may be based on other types of network protocols, such as Controller Area Network (CAN), Local Interconnect Network (LIN), DeviceNet, ControlNet, Data Highway+, PROFIBUS, or PROFINET, among many others. Network connectivity may be provided to/from the platform 900 via NIC 916 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The NIC 916 may include one or more dedicated processors and/or FPGAs to communicate using one or more of the aforementioned network interface protocols. In some implementations, the NIC 916 may include multiple controllers to provide connectivity to other networks using the same or different protocols. For example, the platform 900 may include a first NIC 916 providing communications to the cloud over Ethernet and a second NIC 916 providing communications to other devices over another type of network.

The interconnect 906 may couple the processor circuitry 802 to an external interface 918 (also referred to as "I/O interface circuitry" or the like) that is used to connect external devices or subsystems. The external devices include, inter alia, sensor circuitry 921, actuators 922, and positioning circuitry 945. The sensor circuitry 921 may include devices, modules, or subsystems whose purpose is to detect events or changes in its environment and send the information (sensor data) about the detected events to some other a device, module, subsystem, etc. Examples of such sensors 621 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like), depth sensors, ambient light sensors, ultrasonic transceivers; microphones; etc.

The external interface 918 connects the platform 900 to actuators 922, allow platform 900 to change its state, position, and/or orientation, or move or control a mechanism or system. The actuators 922 comprise electrical and/or mechanical devices for moving or controlling a mechanism or system, and converts energy (e.g., electric current or moving air and/or liquid) into some kind of motion. The actuators 922 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 922 may include one or more electromechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The platform 900 may be configured to operate one or more actuators 922 based on one or more captured events and/or instructions or control signals received from a service provider and/or various client systems. In some embodiments, the sensor circuitry 921 and actuators 922 correspond to the sensors, etc., discussed with regard to FIGS. 10-13.

The positioning circuitry 945 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 945 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 945 may include a Micro-Technology for Positioning, Navigation, and Timing (Micro-PNT) IC that uses a master timing clock to perform position tracking/estimation without GNSS assistance. The positioning circuitry 945 may also be part of, or interact with, the communication circuitry 909 to communicate with the nodes and components of the positioning network. The positioning circuitry 945 may also provide position data and/or time data to the application circuitry, which may use the data to synchronize operations with various infrastructure (e.g., radio base stations), for turn-by-turn navigation, or the like.

In some examples, various input/output (I/O) devices may be present within, or connected to, the platform 900, which are referred to as input device circuitry 996 and output device circuitry 984 in FIG. 9. The input device circuitry 986 and output device circuitry 984 include one or more user interfaces designed to enable user interaction with the platform 900 and/or peripheral component interfaces designed to enable peripheral component interaction with the platform 900. Input device circuitry 986 may include any physical or virtual means for accepting an input including, inter alia, one or more physical or virtual buttons (e.g., a reset button), a physical keyboard, keypad, mouse, touchpad, touchscreen, microphones, scanner, headset, and/or the like.

The output device circuitry 984 may be included to show information or otherwise convey information, such as sensor readings, actuator position(s), or other like information. Data and/or graphics may be displayed on one or more user interface components of the output device circuitry 994. Output device circuitry 994 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, etc.), with the output of characters, graphics, multimedia objects, and the like being generated or produced from the operation of the platform 900. The output device circuitry 994 may also include speakers or other audio emitting devices, printer(s), and/or the like. In some embodiments, the sensor circuitry 921 may be used as the input device circuitry 996 (e.g., an image capture device, motion capture device, or the like) and one or more actuators 922 may be used as the output device circuitry 994 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a universal serial bus (USB) port, an audio jack, a power supply interface, etc.

A battery 924 may be coupled to the platform 900 to power the platform 900, which may be used in embodiments where the platform 900 is not in a fixed location. The battery 924 may be a lithium ion battery, a lead-acid automotive battery, or a metal-air battery, such as a zinc-air battery, an aluminum-air battery, a lithium-air battery, a lithium polymer battery, and/or the like. In embodiments where the platform 900 is mounted in a fixed location, the platform 900 may have a power supply coupled to an electrical grid. In these embodiments, the platform 900 may include power tee circuitry to provide for electrical power drawn from a network cable to provide both power supply and data connectivity to the platform 900 using a single cable.

Power management integrated circuitry (PMIC) 926 may be included in the platform 900 to track the state of charge (SoCh) of the battery 924, and to control charging of the platform 900. The PMIC 926 may be used to monitor other parameters of the battery 924 to provide failure predictions, such as the state of health (SoH) and the state of function (SoF) of the battery 924. The PMIC 926 may include voltage regulators, surge protectors, power alarm detection circuitry. The power alarm detection circuitry may detect one or more of brown out (under-voltage) and surge (over-voltage) conditions. The PMIC 926 may communicate the information on the battery 924 to the processor circuitry 902 over the interconnect 906. The PMIC 926 may also include an analog-to-digital (ADC) convertor that allows the processor circuitry 902 to directly monitor the voltage of the battery 924 or the current flow from the battery 924. The battery parameters may be used to determine actions that the platform 900 may perform, such as transmission frequency, mesh network operation, sensing frequency, and the like. As an example, the PMIC 926 may be a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex.

A power block 928, or other power supply coupled to a grid, may be coupled with the PMIC 926 to charge the battery 924. In some examples, the power block 928 may be replaced with a wireless power receiver to obtain the power wirelessly, for example, through a loop antenna in the platform 900. A wireless battery charging circuit, such as an LTC4020 chip from Linear Technologies of Milpitas, Calif., among others, may be included in the PMIC 926. The specific charging circuits chosen depend on the size of the battery 924, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Furthermore, the embodiments discussed herein may take the form of a computer program product or data to create the computer program, with the computer program or data embodied in any tangible or non-transitory medium of expression having the computer-usable program code (or data to create the computer program) embodied in the medium. In one embodiment, a non-transitory computer-readable storage media (NTCRSM) suitable for use to store instructions (or data that creates the instructions), wherein execution of the instructions cause an apparatus (such as any of the devices/components/systems described with regard to FIGS. 1-9), in response to execution of the instructions by the apparatus, to practice selected aspects of the present disclosure. The NTCRSM may include a number of programming instructions (or data to create the programming instructions). The programming instructions are configured to enable a device (e.g., any of the devices/components/systems described with regard to FIGS. 1-9), in response to execution of the programming instructions, to perform various programming operations associated with operating system functions, one or more applications, and/or aspects of the present disclosure (including various programming operations associated with FIGS. 3-7).

In alternate embodiments, the programming instructions (or data to create the instructions) are disposed on multiple NTCRSM. In alternate embodiments, the programming instructions (or data to create the instructions) are disposed on (or encoded in) computer-readable transitory storage media, such as, signals. The instructions embodied by a machine-readable medium may further be transmitted or received over a communications network using a transmission medium via a network interface device utilizing any one of a number of transfer protocols (e.g., HTTP). Any combination of one or more computer usable or computer readable medium(s) may be utilized. The computer-usable or computer-readable medium may be, for example but not limited to, one or more electronic, magnetic, optical, electromagnetic, infrared, or semiconductor systems, apparatuses, devices, or propagation media. For instance, the NTCRSM may be embodied by devices described for the storage circuitry 908 and/or memory circuitry 904 described with regard to FIG. 9. More specific examples (a non-exhaustive list) of a computer-readable medium would include the following: an electrical connection having one or more wires, a portable computer diskette, a hard disk, a random access memory (RAM), a read-only memory (ROM), an erasable programmable read-only memory (EPROM, Flash memory, etc.), an optical fiber, a portable compact disc read-only memory (CD-ROM), an optical storage device and/or optical disks, a transmission media such as those supporting the Internet or an intranet, a magnetic storage device, or any number of other hardware devices. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (or data to create the program code) as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code (such as that described herein. In another example, the Program code (or data to create the program code) may be stored in a state in which they may be read by a computer, but require addition of a library (e.g., a dynamic link library), a software development kit (SDK), an application programming interface (API), etc. in order to execute the instructions on a particular computing device or other device. In another example, the program code (or data to create the program code) may need to be configured (e.g., settings stored, data input, network addresses recorded, etc.) before the program code (or data to create the program code) can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure may be written in any combination of one or more programming languages, including an object oriented programming language such as Python, Ruby, Scala, Smalltalk, Java™, C++, C #, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code for carrying out operations of the present disclosure may also be written in any combination of the programming languages discussed herein. The program code may execute entirely on the system 800 or 900, partly on the system 800 or 900, as a stand-alone software package, partly on the system 800 or 900 and partly on a remote computer or entirely on the remote computer (e.g., a different one of system 800 or 900). In the latter scenario, the remote computer may be connected to the system 800 or 900 through any type of network, including a local area network (LAN) or a wide area network (WAN), or the connection may be made to an external computer (for example, through the Internet using an Internet Service Provider).

III. EXAMPLE SYSTEM OVERVIEW

The internet of things (IoT) is a concept in which a large number of computing devices are interconnected to each other and to the Internet to provide functionality and data acquisition at very low levels. As used herein, an IoT device may include a semiautonomous device performing a function, such as sensing or control, among others, in communication with other IoT devices and a wider network, such as the Internet. Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet may include very large numbers of IoT devices. Accordingly, as described herein, a number of innovations for the future Internet address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software. The services may be provided in accordance with the Quality of Service (QoS) terms specified in service level and service delivery agreements. The use of IoT devices and networks present a number of new challenges in a heterogeneous network of connectivity comprising a combination of wired and wireless technologies as depicted in FIGS. 10-13.

Figure 10:
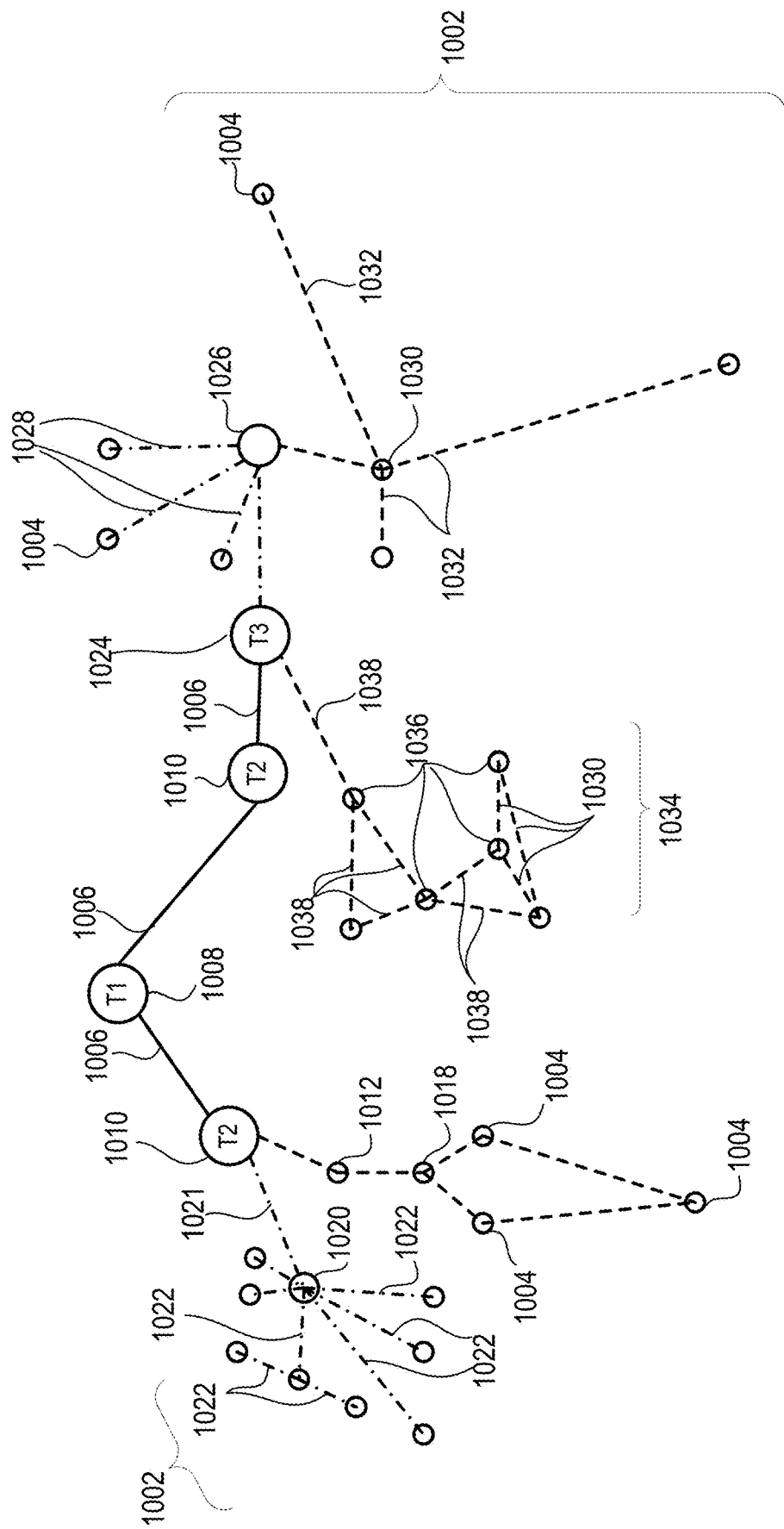
FIG. 10 illustrates an arrangement showing interconnections that may be present between a network and Internet of Things (IoT) networks, in accordance with various embodiments.

FIG. 10 illustrates an arrangement showing interconnections that may be present between the Internet and IoT networks, in accordance with various embodiments. The interconnections may couple smaller networks 1002, down to the individual IoT device 1004, to the fiber backbone 1006 of the Internet 1000. To simplify the drawing, not every device 1004, or other object, is labeled.

In FIG. 10, top-level providers, which may be termed tier 1 providers 1008, are coupled by the fiber backbone of the Internet to other providers, such as secondary or tier 2 providers 910. In one example, a tier 2 provider 1010 may couple to a tower 1012 of an LTE cellular network, for example, by further fiber links, by microwave communications 1014, or by other communications technologies. The tower 1012 may couple to a mesh network including IoT devices 1004 through an LTE communication link 1016, for example, through a central node 1018. The communications between the individual IoT devices 1004 may also be based on LTE or NR communication links 1016. In another example, a high-speed uplink 1021 may couple a tier 2 provider 1010 to a gateway (GW) 1020. A number of IoT devices 1004 may communicate with the GW 1020, and with each other through the GW 1020, for example, over BLE links 1022.

The fiber backbone 1006 may couple lower levels of service providers to the Internet, such as tier 3 providers 1024. A tier 3 provider 1024 may be considered a general Internet service provider (ISP), for example, purchasing access to the fiber backbone 1010 from a tier 2 provider 1010 and providing access to a corporate GW 1026 and other customers. From the corporate GW 1026, a wireless local area network (WLAN) can be used to communicate with IoT devices 1004 through Wi-Fi® links 1028. A Wi-Fi link 1028 may also be used to couple to a low power wide area (LPWA) GW 1030, which can communicate with IoT devices 1004 over LPWA links 1032, for example, compatible with the LoRaWan specification promulgated by the LoRa alliance.

The tier 3 provider 1024 may also provide access to a mesh network 1034 through a coordinator device 1036 that communicates with the tier 3 provider 1024 using any number of communications links, such as an LTE cellular link, an LPWA link, or a link 1038 based on the IEEE 802.15.4 standard, such as Zigbee®. Other coordinator devices 1036 may provide a chain of links that forms cluster tree of linked devices.

IoT devices 1004 may be any object, device, sensor, or "thing" that is embedded with hardware and/or software components that enable the object, device, sensor, or "thing" capable of capturing and/or recording data associated with an event, and capable of communicating such data with one or more other devices over a network with little or no user intervention. For instance, in various embodiments, IoT devices 1004 may be abiotic devices such as autonomous sensors, gauges, meters, image capture devices, microphones, machine-type communications (MTC) devices, machine-to-machine (M2M) devices, light emitting devices, audio emitting devices, audio and/or video playback devices, electro-mechanical devices (e.g., switch, actuator, etc.), and the like. In some embodiments, IoT devices 1004 may be biotic devices such as monitoring implants, biosensors, biochips, and the like. In other embodiments, an IoT device 1004 may be a computer device that is embedded in a computer system and coupled with communications circuitry of the computer system. In such embodiments, the IoT device 1004 refer to a system on chip (SoC), a universal integrated circuitry card (UICC), an embedded UICC (eUICC), and the like, and the computer system may be a mobile station (e.g., a smartphone) or user equipment, laptop PC, wearable device (e.g., a smart watch, fitness tracker, etc.), "smart" appliance (e.g., a television, refrigerator, a security system, etc.), and the like.

Each of the IoT devices 1004 may include one or more memory devices and one or more processors to capture and store/record data. Each of the IoT devices 1004 may include appropriate communications circuitry (e.g., transceiver(s), modem, antenna elements, etc.) to communicate (e.g., transmit and receive) captured and stored/recorded data. Further, each IoT device 1004 may include other transceivers for communications using additional protocols and frequencies. The wireless communications protocols may be any suitable set of standardized rules or instructions implemented by the IoT devices 1004 to communicate with other devices, including instructions for packetizing/depacketizing data, instructions for modulating/demodulating signals, instructions for implementation of protocols stacks, and the like. For example, IoT devices 1004 may include communications circuitry that is configurable to communicate in accordance with one or more person-to-person (P2P) or personal area network (PAN) protocols (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/BLE protocols; ANT protocols; Z-Wave; LTE D2D or ProSe; UPnP; and the like); configurable to communicate using one or more LAN and/or WLAN protocols (e.g., Wi-Fi-based protocols or IEEE 802.11 protocols, such as IEEE 802.16 protocols); one or more cellular communications protocols (e.g., LTE/LTE-A, UMTS, GSM, EDGE, Wi-MAX, etc.); and the like. In embodiments, one or more of the IoT devices 1004, tower 1012, GW 1020, 1026, and 1030, coordinator device 1036, and so forth, may also be incorporated with the embodiments described herein, in particular, with references to FIG. 1-9. In particular, the IoT devices 1004, tower 1012, GW 1020, 1026, and 1030, coordinator device 1036, and so forth, may correspond with the computing devices/systems discussed previously with regard to FIGS. 1-9.

The technologies and networks may enable the exponential growth of devices and networks. As the technologies grow, the network may be developed for self-management, functional evolution, and collaboration, without needing direct human intervention. Thus, the technologies will enable networks to function without centralized controlled systems. The technologies described herein may automate the network management and operation functions beyond current capabilities.

Figure 11:
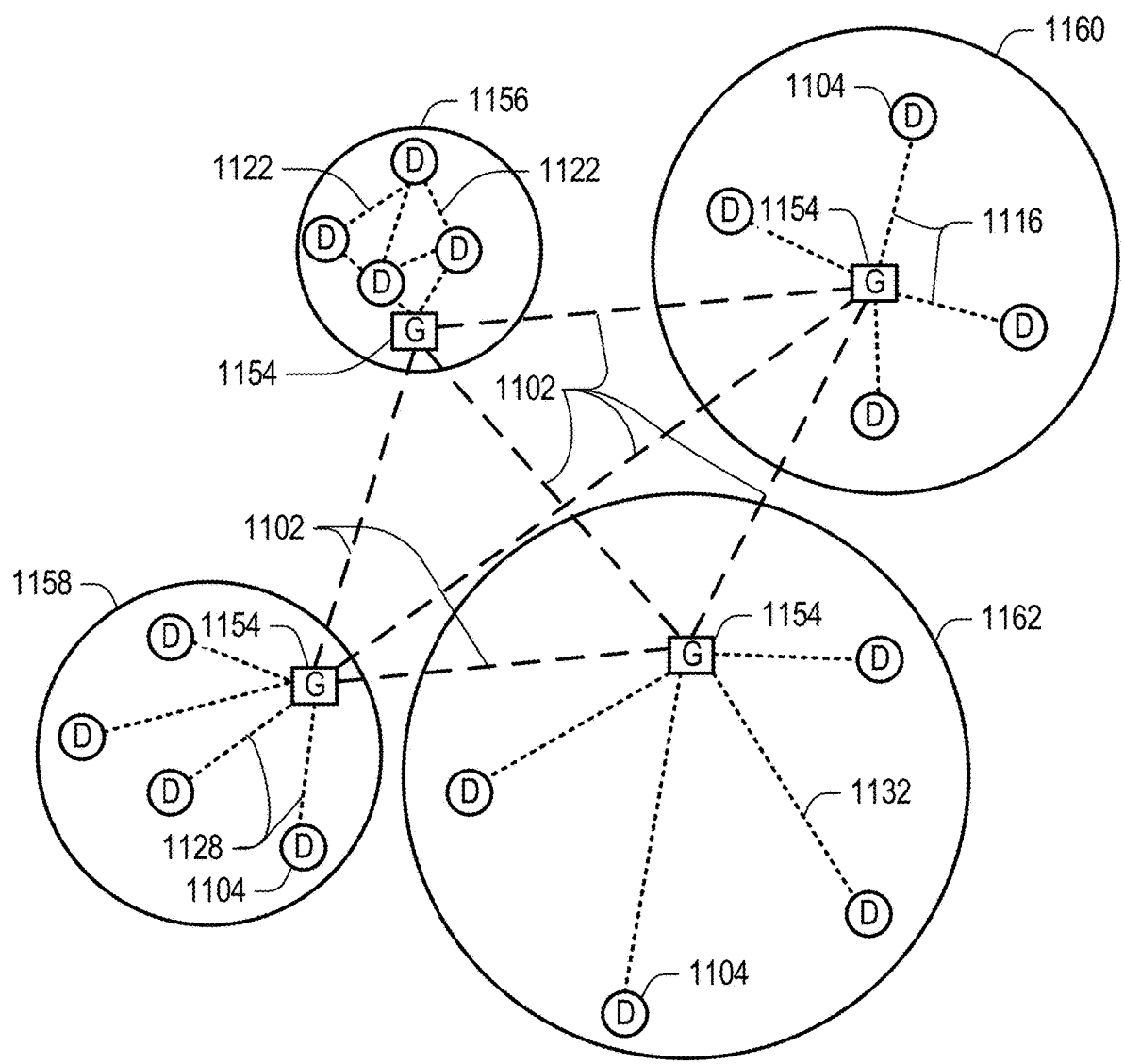
FIG. 11 illustrates an example domain topology, in accordance with various embodiments.

FIG. 11 illustrates an example domain topology 1100 that may be used for a number of IoT networks coupled through backbone links 1102 to GWs 1154, in accordance with various embodiments. To simplify the drawing, not every device 1104, or communications link 1116, 1122, 1128, or 1132 is labeled. The backbone links 1102 may include any number of wired or wireless technologies, and may be part of a local area network (LAN), a wide area network (WAN), or the Internet. Similar to FIG. 10, in embodiments, one or more of IoT devices 1104 (which may be the same or similar as IoT devices 1004 of FIG. 10), GWs 1154, and so forth, may be incorporated with embodiments described herein. In particular, the various devices shown by FIG. 11 may correspond with the UEs 101, AN nodes 111, etc., discussed previously with regard to FIG. 1-9.

The network topology 1100 may include any number of types of IoT networks, such as a mesh network 1156 using BLE links 1122. Other IoT networks that may be present include a WLAN network 1158 using WiFi links 1128, a cellular network 1160 using cellular links 1116, and an LPWA network 1162 using LPWA links 1132. Each of these IoT networks may provide opportunities for new developments, as described herein. For example, communications between IoT devices 1104, such as over the backbone links 1102, may be protected by a decentralized system for authentication, authorization, and accounting (AAA). In a decentralized AAA system, distributed payment, credit, audit, authorization, and authentication systems may be implemented across interconnected heterogeneous infrastructure. This allows systems and networks to move towards autonomous operations.

In these types of autonomous operations, machines may contract for human resources and negotiate partnerships with other machine networks. This may allow the achievement of mutual objectives and balanced service delivery against outlined, planned service level agreements as well as achieve solutions that provide metering, measurements and traceability and trackability. The creation of new supply chain structures and methods may enable a multitude of services to be created, mined for value, and collapsed without any human involvement.

The IoT networks may be further enhanced by the integration of sensing technologies, such as sound, light, electronic traffic, facial and pattern recognition, smell, vibration, into the autonomous organizations. The integration of sensory systems may allow systematic and autonomous communication and coordination of service delivery against contractual service objectives, orchestration and quality of service (QoS) based swarming and fusion of resources.

The mesh network 1106 may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 1158 uses systems that perform standards conversion to provide multi-standard connectivity, enabling IoT devices 1104 using different protocols to communicate. Further systems may provide seamless interconnectivity across a multi-standard infrastructure comprising visible Internet resources and hidden Internet resources. Communications in the cellular network 1160 may be enhanced by systems that offload data, extend communications to more remote devices, or both. The LPWA network 1162 may include systems that perform non-Internet protocol (IP) to IP interconnections, addressing, and routing.

Figure 12:
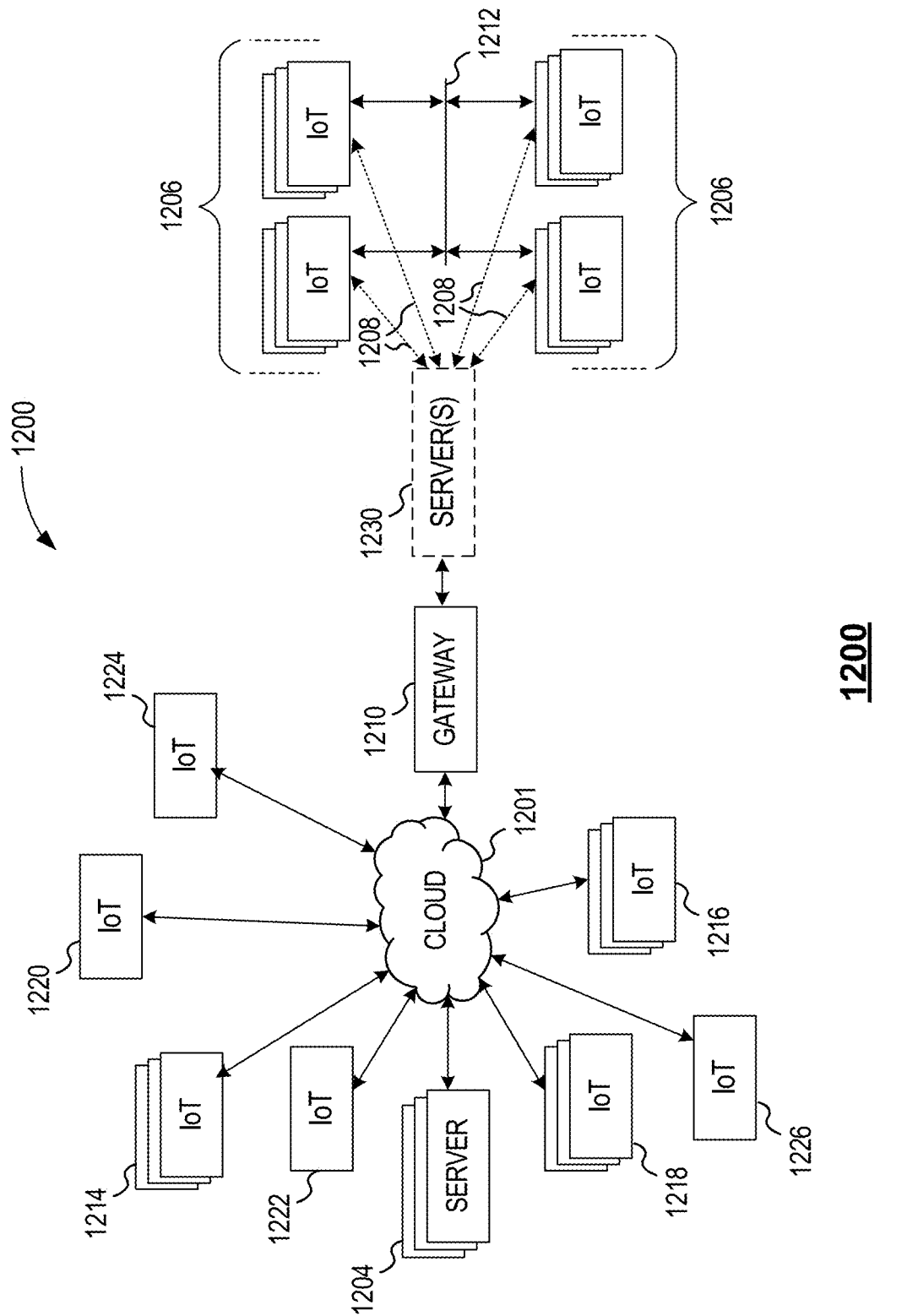
FIG. 12 illustrates an example cloud computing network or cloud in communication with a number of IoT devices, in accordance with various embodiments.

FIG. 12 illustrates an arrangement 1200 of example cloud computing network, or cloud 1201, in communication with a number of Internet of Things (IoT) devices, in accordance with various embodiments. The cloud 1201 may represent the Internet, one or more cellular networks, a local area network (LAN) or a wide area network (WAN) including proprietary and/or enterprise networks for a company or organization, or combinations thereof. Cloud 1201 may correspond to cloud 901 of FIG. 9 and cloud 1001 of FIG. 10. Components used for such communications system can depend at least in part upon the type of network and/or environment selected. Protocols and components for communicating via such networks are well known and will not be discussed herein in detail. However, it should be appreciated that cloud 1201 may be associated with network operator who owns or controls equipment and other elements necessary to provide network-related services, such as one or more base stations or access points, and one or more servers for routing digital data or telephone calls (for example, a core network or backbone network).

The IoT devices in FIG. 12 may be the same or similar to the IoT devices 1004 discussed with regard to FIGS. 10-11. In particular, the IoT devices in FIG. 12 may correspond with the UEs 101, AN nodes 111, etc., discussed previously with regard to FIG. 1-9. The IoT devices may include any number of different types of devices, grouped in various combinations, such as IoT group 1206 that may include IoT devices that provide one or more services for a particular user, customer, organizations, etc. A service provider may deploy the IoT devices in the IoT group 1206 to a particular area (e.g., a geolocation, building, etc.) in order to provide the one or more services. In one example, the IoT group 306 may be a traffic control group where the IoT devices in the IoT group 1206 may include stoplights, traffic flow monitors, cameras, weather sensors, and the like, to provide traffic control and traffic analytics services for a particular municipality or other like entity. Similar to FIGS. 10-11, in embodiments, one or more of IoT devices 1214-1224, GW 1210, and so forth, may be incorporated with the various embodiments described herein, in particular, with references to FIGS. 1-9. For example, in some embodiments, the IoT group 1206, or any of the IoT groups discussed herein, may include the components, devices, systems discussed with regard to FIGS. 1-9.

The IoT group 1206, or other subgroups, may be in communication with the cloud 1201 through wireless links 1208, such as LPWA links, and the like. Further, a wired or wireless sub-network 1212 may allow the IoT devices to communicate with each other, such as through a local area network, a wireless local area network, and the like. The IoT devices may use another device, such as a GW 1210 to communicate with the cloud 1201. Other groups of IoT devices may include remote weather stations 1214, local information terminals 1216, alarm systems 1218, automated teller machines 1220, alarm panels 1222, or moving vehicles, such as emergency vehicles 1224 or other vehicles 1226, among many others. Each of these IoT devices may be in communication with other IoT devices, with servers 1204, or both. In some embodiments, the servers 1204 correspond with the remote server(s) 130 discussed previously, and any of the aforementioned vehicles may correspond with UEs 101 discussed previously.

As can be seen from FIG. 12, a large number of IoT devices may be communicating through the cloud 1201. This may allow different IoT devices to request or provide information to other devices autonomously. For example, the IoT group 1206 may request a current weather forecast from a group of remote weather stations 1214, which may provide the forecast without human intervention. Further, an emergency vehicle 1224 may be alerted by an automated teller machine 1220 that a burglary is in progress. As the emergency vehicle 1224 proceeds towards the automated teller machine 1220, it may access the traffic control group 1206 to request clearance to the location, for example, by lights turning red to block cross traffic at an intersection in sufficient time for the emergency vehicle 1224 to have unimpeded access to the intersection.

In another example, the IoT group 1206 may be an industrial control group (also referred to as a "connected factory", an "industry 4.0" group, and the like) where the IoT devices in the IoT group 1206 may include machines or appliances with embedded IoT devices, radiofrequency identification (RFID) readers, cameras, client computer devices within a manufacturing plant, and the like, to provide production control, self-optimized or decentralized task management services, analytics services, etc. for a particular manufacturer or factory operator. In this example, the IoT group 1206 may communicate with the servers 1204 via GW 1210, server(s) 1230, and cloud 1201 to provide captured data, which may be used to provide performance monitoring and analytics to the manufacturer or factory operator. Additionally, where the GW 1210 or one or more of the server(s) 1230 is or includes AN nodes 111 and/or server(s) 130 of FIGS. 1-9 discussed supra, the IoT group 1206 may communicate with the GW 1210 and/or one or more of the server(s) 1230 for heartbeat signaling according to the various embodiments discussed herein. Furthermore, the IoT devices in the IoT group 1206 may communicate among each other, and/or with other IoT devices of other IoT groups, to make decisions on their own and to perform their tasks as autonomously as possible.

Clusters of IoT devices, such as the IoT groups depicted by FIG. 12, may be equipped to communicate with other IoT devices as well as with the cloud 1201. This may allow the IoT devices to form an ad-hoc network between the devices, allowing them to function as a single device, which may be termed a fog device. This is discussed further with respect to FIG. 12.

Figure 13:
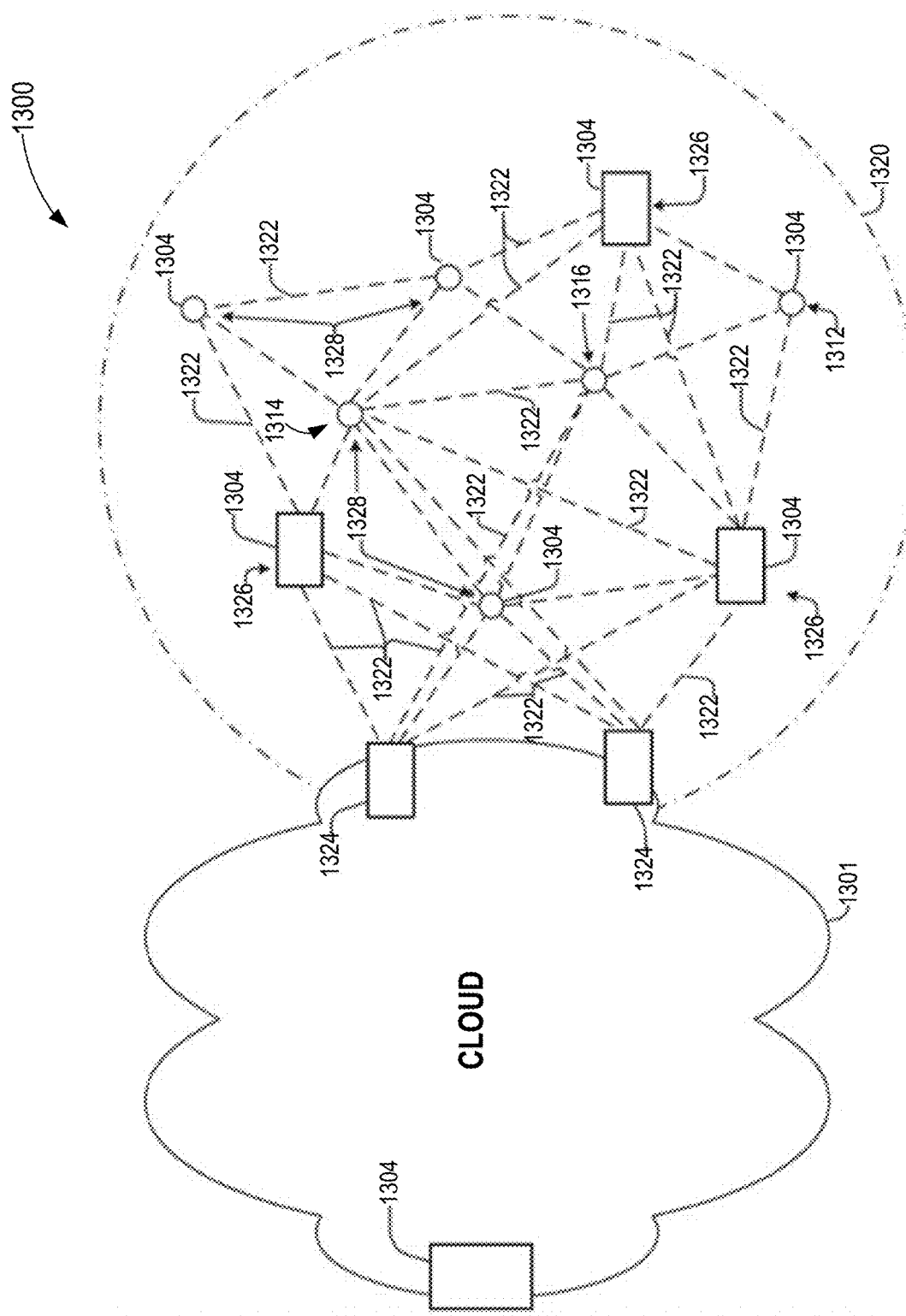
FIG. 13 illustrates an arrangement of a cloud computing network or cloud in communication with a mesh network of IoT devices or IoT fog, in accordance with various embodiments.

FIG. 13 illustrates an arrangement 1300 of a cloud computing network, or cloud 1301, in communication with a mesh network of IoT devices, which may be termed a fog device 1320 or fog 1320, operating at the edge of the cloud 1301, in accordance with various embodiments. Cloud 1301 may be the same or similar to cloud 1001 of FIG. 10 and cloud 1201 of FIG. 12. In this example, the fog 1320 is a group of IoT devices at an intersection (e.g., and may include one or more IoT groups 1206 of FIG. 12 and/or one or more IoT UEs 101 of FIG. 1). The fog 1320 may be established in accordance with specifications released by the OpenFog Consortium (OFC), the Open Connectivity Foundation™ (OCF), among others. In some embodiments, the fog 1320 may be a tangle as defined by the IOTA foundation. Additionally, each of the IoT devices in the fog 1320 may correspond with the EMS appliances, physical nodes, relay controllers, etc., discussed previously with regard to FIGS. 1-9.

In embodiments, fog computing systems, such as fog 1320, may be mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from Cloud 1301 to Things (e.g., IoT devices 1304).

Fog computing systems may be used to perform low-latency computation/aggregation on the data while routing it to an edge cloud computing service and/or a central cloud computing service (e.g., server(s) 130 in FIG. 1) for performing heavy computations or computationally burdensome tasks. On the other hand, edge cloud computing consolidates human-operated, voluntary resources, as a cloud. These voluntary resource may include, inter-alia, UEs 101, desktop PCs, tablets, smartphones, nano data centers, and the like. In various implementations, resources in the edge cloud may be in one to two-hop proximity to the IoT devices 1304 (or UEs 101 in FIGS. 1-7), which may result in reducing overhead related to processing data and may reduce network delay.

In some embodiments, the fog 1320 may be a consolidation of IoT devices 1304 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks offloaded by edge resources.

In embodiments, the fog 1320 may operate at the edge of the cloud 1301. The fog 1320 operating at the edge of the cloud 1301 may overlap or be subsumed into an edge network of the cloud 1301. The edge network of the cloud 1301 may overlap with the fog 1320, or become a part of the fog 1320. Furthermore, the fog 1320 may be an edge-fog network that includes an edge layer and a fog layer. The edge layer of the edge-fog network includes a collection of loosely coupled, voluntary and human-operated resources (e.g., the aforementioned edge devices). The Fog layer resides on top of the edge layer and is a consolidation of networking devices such as the UEs 101 of FIGS. 1-9.

Data may be captured, stored/recorded, and communicated among the IoT devices 1304 (or, for example, among the UEs 101 that have direct links 105 with one another as shown by FIG. 1). Analysis of the traffic flow and control schemes may be implemented by aggregators 1326 that are in communication with the IoT devices 1304 (or UEs 101) and each other through a mesh network. The aggregators 1326 may be a type of IoT device 1304 and/or network appliance. In the example of FIG. 1, the aggregators may be stationary infrastructure equipment, such as the (R)AN nodes 111, or one or more designated UEs 101. Data may be uploaded to the cloud 1301 (e.g., server(s) 130 in FIG. 1) via the aggregator, and commands can be received from the cloud 1301 through GWs 1324 that are in communication with the IoT devices 1304 and the aggregators 1326 through the mesh network. Unlike the traditional cloud computing model, in some implementations, the cloud 1301 may have little or no computational capabilities and only serves as a repository for archiving data recorded and processed by the fog 1320. In these implementations, the cloud 1301 centralized data storage system and provides reliability and access to data by the computing resources in the fog 1320 and/or edge devices. Being at the core of the architecture, the Data Store of the cloud 1301 is accessible by both Edge and Fog layers of the aforementioned edge-fog network.

Similar to FIGS. 10-13, in embodiments, one or more of IoT devices 1304, aggregators 1326, and so forth, may be incorporated with the various embodiments described herein, in particular, with references to FIGS. 1-9. For example, and with reference to FIG. 1, the links 105 and/or 103 that are enabled by use of a suitable communication technology allow the UEs 101 to form a cloud network or fog 1320 for collaborating, as well as for exchanging and carrying forward heartbeat signals according to the embodiments discussed herein. Clusters of the UEs 101 are equipped to communicate with one another, as well as with stationary infrastructure equipment to form ad-hoc networks allowing the UEs 101 to function as a fog 1320.

Any number of communications links may be used in the fog 1320. Shorter-range links 1322, for example, compatible with IEEE 802.15.4 may provide local communications between IoT devices that are proximate to one another or other devices. Longer-range links 1322, for example, compatible with LPWA standards, may provide communications between the IoT devices and the GWs 1324. To simplify the diagram, not every communications link 1322 is labeled with a reference number.

The fog 1320 may be considered to be a massively interconnected network wherein a number of IoT devices are in communications with each other, for example, by the communication links 1322. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the AllJoyn protocol from the AllSeen alliance, the optimized link state routing (OLSR) Protocol, or the better approach to mobile ad-hoc networking (B.A.T.M.A.N), among many others.

Communications from any IoT device may be passed along the most convenient path between any of the IoT devices to reach the GWs 1324. In these networks, the number of interconnections may provide substantial redundancy, allowing communications to be maintained, even with the loss of a number of IoT devices.

Not all of the IoT devices may be permanent members of the fog 1320. In the example of FIG. 13, three transient IoT devices have joined the fog 1320, a first mobile device 1312, a second mobile device 1314, and a third mobile device 1316. The fog 1320 may be presented to clients in the cloud 1301, such as the server 1334, as a single device located at the edge of the cloud 1301. In this example, the control communications to specific resources in the fog 1320 may occur without identifying any specific IoT device 1304 within the fog 1320. Accordingly, if any IoT device 1304 fails, other IoT devices 1304 may be able to discover and control a resource. For example, the IoT devices 1304 may be wired so as to allow any one of the IoT devices 1304 to control measurements, inputs, outputs, etc., for the other IoT devices 1304. The aggregators 1326 may also provide redundancy in the control of the IoT devices 1304 and other functions of the fog 1320.

In some examples, the IoT devices may be configured using an imperative programming style, e.g., with each IoT device having a specific function and communication partners. However, the IoT devices forming the fog 1320 may be configured in a declarative programming style, allowing the IoT devices to reconfigure their operations and communications, such as to determine needed resources in response to conditions, queries, and device failures. This may be performed as transient IoT devices, such as the mobile devices 1312, 1314, 1316, join the fog 1320. As transient or mobile IoT devices enter or leave the fog 1320, the fog 1320 may reconfigure itself to include those devices. This may be performed by forming a temporary group of the mobile devices 1312 and 1314 and the third mobile device 1316 to control or otherwise communicate with the IoT devices 1304. If one or both of the devices 1312, 1314 are autonomous, the temporary group may provide instructions to the devices 1312, 1314. As the transient devices 1312, 1314, and 1316, leave the vicinity of the fog 1320, it may reconfigure itself to eliminate those IoT devices 1304 from the network. The fog 1320 may also divide itself into functional units, such as the IoT devices 1304 and other IoT devices proximate to a particular area or geographic feature, or other IoT devices that perform a particular function. This type of combination may enable the formation of larger IoT constructs using resources from the fog 1320.

As illustrated by the fog 1320, the organic evolution of IoT networks is central to maximizing the utility, availability and resiliency of IoT implementations. Further, the example indicates the usefulness of strategies for improving trust and therefore security. The local identification of devices may be important in implementations, as the decentralization of identity ensures a central authority cannot be exploited to allow impersonation of objects that may exist within the IoT networks. Further, local identification lowers communication overhead and latency.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

As used herein, the term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

As used herein, the term "processor circuitry" refers to, is part of, or includes circuitry capable of sequentially and automatically carrying out a sequence of arithmetic or logical operations, or recording, storing, and/or transferring digital data. and/or any other device capable of executing or otherwise operating computer-executable instructions, such as program code, software modules, and/or functional processes. As used herein, the term "module" is one or more independent electronic circuits packaged onto a circuit board, SoC, System-in-Package (SiP), etc., configured to provide a basic function within a computer system. The term "module" may refer to, be part of, or include an FPD, ASIC, a processor (shared, dedicated, or group) and/or memory (shared, dedicated, or group) that execute one or more software or firmware programs, a combinational logic circuit, and/or other suitable components that provide the described functionality.

As used herein, the terms "instantiate," "instantiation," and the like may refer to the creation of an instance, and an "instance" may refer to a concrete occurrence of an object, which may occur, for example, during execution of program code. As used herein, a "database object", "data object", or the like may refer to any representation of information in a database that is in the form of an object, attribute-value pair (AVP), key-value pair (KVP), tuple, etc., and may include variables, data structures, functions, methods, classes, database records, database fields, database entities, associations between data and database entities (also referred to as a "relation"), and the like.

As used herein, the term "resource" refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. The term "network resource" may refer to a resource hosted by a remote entity (e.g., a cloud computing service) and accessible over a network. The term "on-device resource" may refer to a resource hosted inside a device and enabling access to the device, and thus, to the related physical entity.

As used herein, the term "device" may refer to a physical entity embedded inside, or attached to, another physical entity in its vicinity, with capabilities to convey digital information from or to that physical entity. As used herein, the term "element" may refer to a unit that is indivisible at a given level of abstraction and has a clearly defined boundary, wherein an element may be any type of entity. As used herein, the term "controller" may refer to an element or entity that has the capability to affect a physical entity, such as by changing its state or causing the physical entity to move. As used herein, the term "entity" may refer to (1) a distinct component of an architecture or device, or (2) information transferred as a payload.

As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices for the purpose of transmitting and receiving information.

As used herein, the term "computer system" refers to any type interconnected electronic devices, computer devices, or components thereof. Additionally, the term "computer system" and/or "system" may refer to various components of a computer that are communicatively coupled with one another, or otherwise organized to accomplish one or more functions. Furthermore, the term "computer system" and/or "system" may refer to multiple computer devices and/or multiple computing systems that are communicatively coupled with one another and configured to share computing and/or networking resources. As used herein, the term "architecture" may refer to a fundamental organization of a system embodied in its components, their relationships to one another, and to an environment, as well as to the principles guiding its design and evolution. As used herein, the term "appliance," "computer appliance," or the like, refers to a discrete hardware device with integrated program code (e.g., software or firmware) that is specifically or specially designed to provide a specific computing resource. A "virtual appliance" is a virtual machine image to be implemented by a hypervisor-equipped device that virtualizes or emulates a computer appliance or otherwise is dedicated to provide a specific computing resource.

As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

IV. EXAMPLES

Illustrative examples of the devices, systems, and methods disclosed herein are provided below. An embodiment of the devices, systems, and methods may include any one or more, and any combination of, the examples described below.

Example 1 includes an apparatus of a first device having a first heartbeat signal, the apparatus comprising: memory circuitry arranged to store an indication of a received second heartbeat signal broadcasted by a second device, the second heartbeat signal for accessing or maintaining a service provided by a service provider via an access network node (AN); and heartbeat circuitry coupled with the memory circuitry, the heartbeat circuitry arranged to generate the first heartbeat signal to include the indication of the second heartbeat signal, the indication of the second heartbeat signal in the first heartbeat signal to facilitate discovery of the second device by the AN.

Example 2 includes the apparatus of example 1 and/or some other example(s) herein, wherein the first device comprises signaling circuitry communicatively coupled with the heartbeat circuitry, the signaling circuitry arranged to detect the second heartbeat signal broadcasted by the second device, and the heartbeat circuitry uses the signal circuitry to broadcast the first heartbeat signal at or towards the AN.

Example 3 includes the apparatus of example 2 and/or some other example(s) herein, wherein the heartbeat circuitry is arranged to: cause the signaling circuitry to broadcast the first heartbeat signal after entering a coverage area of the AN, wherein detection of the second heartbeat signal takes place outside of the coverage area of the AN.

Example 4 includes the apparatus of examples 2-3 and/or some other example(s) herein, wherein: the signaling circuitry is arranged to receive an acknowledgement (ACK) message from the AN, the ACK message indicating that the first heartbeat signal was properly decoded by the AN; and the heartbeat circuitry is arranged to flush the indication from the memory circuitry in response to receipt of the ACK message.

Example 5 includes the apparatus of examples 1-4 and/or some other example(s) herein, wherein the heartbeat circuitry is arranged to: determine, based on information included in the second heartbeat signal, whether to include the indication of the second heartbeat signal in the first heartbeat signal.

Example 6 includes the apparatus of example 5 and/or some other example(s) herein, wherein the information included in the second heartbeat signal includes a carry forward bit, and wherein the heartbeat circuitry is arranged to: generate the first heartbeat signal to include the indication of the second heartbeat signal when the carry forward bit in the second heartbeat signal is set.

Example 7 includes the apparatus of example 6 and/or some other example(s) herein, wherein the carry forward bit is included in a message header section, and the indication of the second heartbeat signal is included in a message body section.

Example 8 includes the apparatus of example 7 and/or some other example(s) herein, wherein the indication of the second heartbeat signal is a Universally Unique Identifier (UUID) assigned to the second device.

Example 9 includes the apparatus of examples 1-8 and/or some other example(s) herein, wherein the heartbeat circuitry is arranged to: generate another first heartbeat signal to include an indicator of the first device, wherein the indicator of the first device in the other first heartbeat signal is to facilitate discovery of the first device by the AN; and cause the other first heartbeat signal to be broadcast according to a predefined interval.

Example 10 includes the apparatus of example 9 and/or some other example(s) herein, wherein the heartbeat circuitry is arranged to: set a carry forward bit in the other first heartbeat signal when the first device is unable to discover the AN or is unable to be discovered by the AN.

Example 11 includes one or more computer readable media (CRSM) comprising instructions of a heartbeat state machine, wherein execution of the instructions by a first computing device is to cause the first computing device having a first heartbeat signal, to: upon receipt of a second heartbeat signal broadcasted by a second computing device, enter a validity check state to check a validity of the second heartbeat signal and to control storage of information encoded in the second heartbeat signal; and enter a heartbeat signaling state when a result of the validity check indicates to carry forward the second heartbeat signal, wherein in the heartbeat signaling state, execution of the instructions is to cause the first computing device to: generate the first heartbeat signal to include an indication of the second heartbeat signal to facilitate discovery of the second computing device by an access network node (AN), the indication being based on the stored information, and cause broadcast of the first heartbeat signal according to a predefined heartbeat signaling interval.

Example 12 includes the one or more CRSM of example 11 and/or some other example(s) herein, wherein execution of the instructions is to cause the first computing device to: enter the heartbeat signaling state after entering a coverage area of the AN, wherein detection of the second heartbeat signal takes place outside of the coverage area of the AN.

Example 13 includes the one or more CRSM of examples 11-12 and/or some other example(s) herein, wherein execution of the instructions is to cause the first computing device to: enter a memory flush state to discard the stored information of the second heartbeat signal upon receipt of an acknowledgement (ACK) message from the AN indicating receipt of the first heartbeat signal.

Example 14 includes the one or more CRSM of examples 11-13 and/or some other example(s) herein, wherein execution of the instructions is to cause the first computing device to: determine, while in the validity check state, whether to include the indication of the second heartbeat signal in the first heartbeat signal based on information included in the second heartbeat signal.

Example 15 includes the one or more CRSM of example 14 and/or some other example(s) herein, wherein the information included in the second heartbeat signal includes a carry forward bit, and wherein execution of the instructions is to cause the first computing device to: generate, while in the heartbeat signaling state, the first heartbeat signal to include the indication of the second heartbeat signal when the carry forward bit in the second heartbeat signal is set.

Example 16 includes the one or more CRSM of example 15 and/or some other example(s) herein, wherein the carry forward bit is included in a message header section, and the indication of the second heartbeat signal is included in a message body section.

Example 17 includes the one or more CRSM of example 16 and/or some other example(s) herein, wherein the indication of the second heartbeat signal is a Universally Unique Identifier (UUID) assigned to the second computing device.

Example 18 includes the one or more CRSM of examples 11-17 and/or some other example(s) herein, wherein, in the heartbeat signaling state, execution of the instructions is to cause the first computing device to: generate another first heartbeat signal to include an indicator of the first computing device, wherein the indicator of the first computing device in the other first heartbeat signal is to facilitate discovery of the first computing device by the AN; and cause the other first heartbeat signal to be broadcast according to a predefined interval.

Example 19 includes the one or more CRSM of example 18 and/or some other example(s) herein, wherein, in the heartbeat signaling state, execution of the instructions is to cause the first computing device to: set a carry forward bit in the other first heartbeat signal when the first computing device is unable to discover the AN or is unable to be discovered by the AN.

Example 20 includes a method to be performed by a wireless access node (WAN), the method comprising: receiving, by the WAN, a first heartbeat signal from a first computing device being served by the WAN; decoding, by the WAN, the first heartbeat signal to obtain an indication of a second heartbeat signal of a second computing device that is not being served by the WAN; determining, by the WAN, a roaming range of the second computing device based on the indication; and adjusting, by the WAN, one or more service configuration parameters to facilitate discovery of the second computing device.

Example 21 includes the method of example 20 and/or some other example(s) herein, further comprising: transmitting, by the WAN, an acknowledgement (ACK) message to the first computing device, the ACK message indicating that the first heartbeat signal was properly decoded.

Example 22 includes the method of examples 20-21 and/or some other example(s) herein, further comprising: determining a roaming area of the second computing device.

Example 23 includes the method of example 22 and/or some other example(s) herein, wherein determining the roaming area comprising: operating, by the WAN, one or more artificial intelligence (AI) or machine learning (ML) algorithms to predict a range of the roaming area of the second computing device.

Example 24 includes the method of examples 20-22 and/or some other example(s) herein, wherein the WAN is a cellular base station, and the method comprises: operating, by the WAN, one or more self-organizing network (SON) functions to determine the one or more service configuration parameters to be adjusted to facilitate discovery of the second computing device.

Example 25 includes the method of example 24 and/or some other example(s) herein, wherein the one or more service configuration parameters include one or more of antenna tilt, antenna azimuth, downlink transmit power, coverage area size, coverage area capacity, coverage area shape, one or more handover parameters, an idle mobility configuration, one or more random access channel (RACH) parameters, and one or more cell individual offset (CIO) parameters.

Example 26 includes a method to be performed by a first device having a first heartbeat signal, the method comprising: storing, by the first device, an indication of a received second heartbeat signal broadcasted by a second device, the second heartbeat signal for accessing or maintaining a service provided by a service provider via an access network node (AN); and generating, by the first device, the first heartbeat signal to include the indication of the second heartbeat signal, wherein the indication of the second heartbeat signal in the first heartbeat signal is to facilitate discovery of the second device by the AN.

Example 27 includes the method of example 26 and/or some other example(s) herein, further comprising: detecting, by the first device, the second heartbeat signal broadcasted by the second device, and broadcasting, by the first device, the first heartbeat signal at or towards the AN.

Example 28 includes the method of example 27 and/or some other example(s) herein, further comprising: broadcasting, by the first device, after entering a coverage area of the AN, wherein detection of the second heartbeat signal takes place outside of the coverage area of the AN.

Example 29 includes the apparatus of examples 27-28 and/or some other example(s) herein, further comprising: receiving, by the first device, an acknowledgement (ACK) message from the AN, the ACK message indicating that the first heartbeat signal was properly decoded by the AN; and flushing, by the first device, the indication from the memory circuitry in response to receipt of the ACK message.

Example 30 includes the method of examples 26-29 and/or some other example(s) herein, further comprising: determining, by the first device based on information included in the second heartbeat signal, whether to include the indication of the second heartbeat signal in the first heartbeat signal.

Example 31 includes the method of example 30 and/or some other example(s) herein, wherein the information included in the second heartbeat signal includes a carry forward bit, and the method further comprises: generating, by the first device, the first heartbeat signal to include the indication of the second heartbeat signal when the carry forward bit in the second heartbeat signal is set.

Example 32 includes the method of example 31 and/or some other example(s) herein, wherein the carry forward bit is included in a message header section, and the indication of the second heartbeat signal is included in a message body section.

Example 33 includes the method of example 32 and/or some other example(s) herein, wherein the indication of the second heartbeat signal is a Universally Unique Identifier (UUID) assigned to the second device.

Example 34 includes the method of examples 26-33 and/or some other example(s) herein, further comprising: generating, by the first device, another first heartbeat signal to include an indicator of the first device, wherein the indicator of the first device in the other first heartbeat signal is to facilitate discovery of the first device by the AN; and causing, by the first device, the other first heartbeat signal to be broadcast according to a predefined interval.

Example 35 includes the apparatus of example 34 and/or some other example(s) herein, further comprising: setting, by the first device, a carry forward bit in the other first heartbeat signal when the first device is unable to discover the AN or is unable to be discovered by the AN.

Example 36 includes a method to be performed by a first computing device, the method comprising: entering, by the first computing device upon receipt of a second heartbeat signal broadcasted by a second computing device, a validity check state to check a validity of the second heartbeat signal; storing, by the first computing device while in the validity check state, information encoded in the second heartbeat signal; entering, by the first computing device, a heartbeat state when a result of the validity check indicates to carry forward the second heartbeat signal; generating, by the first computing device while in the heartbeat state, the first heartbeat signal to include an indication of the second heartbeat signal to facilitate discovery of the second computing device by an access network node (AN), the indication being based on the stored information; and causing, by the first computing device while in the heartbeat state, broadcast of the first heartbeat signal according to a predefined heartbeat signaling interval.

Example 37 includes the method of example 36 and/or some other example(s) herein, further comprising: entering, by the first computing device, the heartbeat state after entering a coverage area of the AN, wherein detection of the second heartbeat signal takes place outside of the coverage area of the AN.

Example 38 includes the method of examples 36-37 and/or some other example(s) herein, further comprising: entering, by the first computing device, a memory flush state to discard the stored information of the second heartbeat signal upon receipt of an acknowledgement (ACK) message from the AN indicating receipt of the first heartbeat signal.

Example 39 includes the method of examples 36-38 and/or some other example(s) herein, further comprising: determining, by the first computing device while in the validity check state, whether to include the indication of the second heartbeat signal in the first heartbeat signal based on information included in the second heartbeat signal.

Example 40 includes the method of example 39 and/or some other example(s) herein, wherein the information included in the second heartbeat signal includes a carry forward bit, and wherein the method comprises: generating, by the first computing device while in the heartbeat state, the first heartbeat signal to include the indication of the second heartbeat signal when the carry forward bit in the second heartbeat signal is set.

Example 41 includes the method of example 40 and/or some other example(s) herein, wherein the carry forward bit is included in a message header section, and the indication of the second heartbeat signal is included in a message body section.

Example 42 includes the method of example 41 and/or some other example(s) herein, wherein the indication of the second heartbeat signal is a Universally Unique Identifier (UUID) assigned to the second computing device.

Example 43 includes the method of examples 36-42 and/or some other example(s) herein, wherein, in the heartbeat state, and the method comprises: generating, by the first computing device, another first heartbeat signal to include an indicator of the first computing device, wherein the indicator of the first computing device in the other first heartbeat signal is to facilitate discovery of the first computing device by the AN; and causing, by the first computing device, the other first heartbeat signal to be broadcast according to a predefined interval.

Example 44 includes the method of example 43 and/or some other example(s) herein, wherein, when the first computing device is in the heartbeat state, the method comprises: setting, by the first computing device, a carry forward bit in the other first heartbeat signal when the first computing device is unable to discover the AN or is unable to be discovered by the AN.

Example 45 includes a wireless access node (WAN) comprising: communication means for receiving a first heartbeat signal from a first computing device being served by the WAN; decoding means for decoding the first heartbeat signal to obtain an indication of a second heartbeat signal of a second computing device that is not being served by the WAN; and processing means for determining a roaming range of the second computing device based on the indication, and for controlling adjustment of one or more service configuration parameters to facilitate discovery of the second computing device.

Example 46 includes the WAN of example 45 and/or some other example(s) herein, further comprising encoding means for encoding an acknowledgement (ACK) message indicating that the first heartbeat signal was properly decoded, and wherein the communication means is for transmitting the ACK message to the first computing device.

Example 47 includes the WAN of examples 45-46 and/or some other example(s) herein, wherein the processing means is for determining a roaming area of the second computing device.

Example 48 includes the WAN of example 47 and/or some other example(s) herein, wherein the processing means is for operating one or more artificial intelligence (AI) or machine learning (ML) algorithms to predict a range of the roaming area of the second computing device.

Example 49 includes the WAN of examples 45-47 and/or some other example(s) herein, wherein the WAN is a cellular base station, and the processing means is for operating one or more self-organizing network (SON) functions to determine the one or more service configuration parameters to be adjusted to facilitate discovery of the second computing device.

Example 50 includes the WAN of example 49 and/or some other example(s) herein, wherein the one or more service configuration parameters include one or more of antenna tilt, antenna azimuth, downlink transmit power, coverage area size, coverage area capacity, coverage area shape, one or more handover parameters, an idle mobility configuration, one or more random access channel (RACH) parameters, and one or more cell individual offset (CIO) parameters.

Example 51 may include an apparatus comprising means to perform one or more elements of a method described in or related to any of examples 1-50, or any other method or process described herein.

Example 52 may include one or more non-transitory computer-readable media comprising instructions to cause an electronic device, upon execution of the instructions by one or more processors of the electronic device, to perform one or more elements of a method described in or related to any of examples 1-50, or any other method or process described herein.

Example 53 may include an apparatus comprising logic, modules, or circuitry to perform one or more elements of a method described in or related to any of examples 1-50, or any other method or process described herein.

Example 54 may include a method, technique, or process as described in or related to any of examples 1-50, or portions or parts thereof.

Example 55 may include an apparatus comprising: one or more processors and one or more computer-readable media comprising instructions that, when executed by the one or more processors, cause the one or more processors to perform the method, techniques, or process as described in or related to any of examples 1-50, or portions thereof.

Example 56 may include a signal as described in or related to any of examples 1-50, or portions or parts thereof.

Example 57 may include a signal in a wireless network as shown and described herein.

Example 58 may include a method of communicating in a wireless network as shown and described herein.

Example 59 may include a system for providing wireless communication as shown and described herein.

Example 60 may include a device for providing wireless communication as shown and described herein.

The present disclosure has been described with reference to flowchart illustrations and/or block diagrams of methods, apparatus (systems), and/or computer program products according to embodiments of the present disclosure. In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

It will be understood that each block of the flowchart illustrations and/or block diagrams, and combinations of blocks in the flowchart illustrations and/or block diagrams, may be implemented in hardware, firmware, software, or any combination thereof. The disclosed embodiments may be implemented as a computer process, a computing system, or as an article of manufacture such as a computer program product of computer readable media. The computer program product may include one or more transitory or non-transitory machine-readable (e.g., computer-readable) media comprising encoded computer program instructions for executing the computer process, which is readable and/or executable by one or more processors of a computer system. The machine-readable storage medium may be embodied as any storage device, mechanism, or other physical structure for storing or transmitting information in a form readable by a machine (e.g., a volatile or non-volatile memory, a media disc, or other media device). These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

As used herein, the term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

As used herein, the term "processor circuitry" refers to, is part of, or includes circuitry capable of sequentially and automatically carrying out a sequence of arithmetic or logical operations, or recording, storing, and/or transferring digital data. and/or any other device capable of executing or otherwise operating computer-executable instructions, such as program code, software modules, and/or functional processes. As used herein, the term "module" is one or more independent electronic circuits packaged onto a circuit board, SoC, System-in-Package (SiP), etc., configured to provide a basic function within a computer system. The term "module" may refer to, be part of, or include an FPD, ASIC, a processor (shared, dedicated, or group) and/or memory (shared, dedicated, or group) that execute one or more software or firmware programs, a combinational logic circuit, and/or other suitable components that provide the described functionality.

As used herein, the terms "instantiate," "instantiation," and the like may refer to the creation of an instance, and an "instance" may refer to a concrete occurrence of an object, which may occur, for example, during execution of program code. As used herein, a "database object", "data object", or the like may refer to any representation of information in a database that is in the form of an object, attribute-value pair (AVP), key-value pair (KVP), tuple, etc., and may include variables, data structures, functions, methods, classes, database records, database fields, database entities, associations between data and database entities (also referred to as a "relation"), and the like.

As used herein, the term "resource" refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. The term "network resource" may refer to a resource hosted by a remote entity (e.g., a cloud computing service) and accessible over a network. The term "on-device resource" may refer to a resource hosted inside a device and enabling access to the device, and thus, to the related physical entity.

As used herein, the term "device" may refer to a physical entity embedded inside, or attached to, another physical entity in its vicinity, with capabilities to convey digital information from or to that physical entity. As used herein, the term "element" may refer to a unit that is indivisible at a given level of abstraction and has a clearly defined boundary, wherein an element may be any type of entity. As used herein, the term "controller" may refer to an element or entity that has the capability to affect a physical entity, such as by changing its state or causing the physical entity to move. As used herein, the term "entity" may refer to (1) a distinct component of an architecture or device, or (2) information transferred as a payload.

As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices for the purpose of transmitting and receiving information. As used herein, the terms "access node," "access point," or the like may describe network elements or other like equipment that provides the radio baseband functions and/or wire-based functions for data and/or voice connectivity between a network and one or more users. As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host one or more virtual machines.

As used herein, the term "computer system" refers to any type interconnected electronic devices, computer devices, or components thereof. Additionally, the term "computer system" and/or "system" may refer to various components of a computer that are communicatively coupled with one another, or otherwise organized to accomplish one or more functions. Furthermore, the term "computer system" and/or "system" may refer to multiple computer devices and/or multiple computing systems that are communicatively coupled with one another and configured to share computing and/or networking resources. As used herein, the term "architecture" may refer to a fundamental organization of a system embodied in its components, their relationships to one another, and to an environment, as well as to the principles guiding its design and evolution. As used herein, the term "appliance," "computer appliance," or the like, refers to a discrete hardware device with integrated program code (e.g., software or firmware) that is specifically or specially designed to provide a specific computing resource. A "virtual appliance" is a virtual machine image to be implemented by a hypervisor-equipped device that virtualizes or emulates a computer appliance or otherwise is dedicated to provide a specific computing resource.

As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiments were chosen and described in order to best explain the principles of the disclosure and the practical application, and to enable others of ordinary skill in the art to understand the disclosure for embodiments with various modifications as are suited to the particular use contemplated.

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

What is claimed is:

1. An apparatus of a first device having a first heartbeat signal, the apparatus comprising:
   memory circuitry arranged to store an indication of a received second heartbeat signal broadcasted by a second device, the second heartbeat signal for accessing or maintaining a service provided by a service provider via an network access node (NAN);
   heartbeat circuitry coupled with the memory circuitry, the heartbeat circuitry arranged to generate the first heartbeat signal to include the indication of the second heartbeat signal, the indication of the second heartbeat signal in the first heartbeat signal to facilitate discovery of the second device by the NAN; and
   signaling circuitry communicatively coupled with the heartbeat circuitry, the signaling circuitry arranged to transmit or broadcast the first heartbeat signal at or towards the NAN.

2. The apparatus of claim 1, wherein the signaling circuitry is further arranged to detect the second heartbeat signal broadcasted by the second device, and the heartbeat circuitry uses the signal circuitry to transmit or broadcast the first heartbeat signal at or towards the NAN.

3. The apparatus of claim 2, wherein the heartbeat circuitry is arranged to:
   cause the signaling circuitry to broadcast the first heartbeat signal after entering a coverage area of the NAN, wherein detection of the second heartbeat signal takes place outside of the coverage area of the NAN.

4. The apparatus of claim 2, wherein:
   the signaling circuitry is arranged to receive an acknowledgement (ACK) message from the NAN, the ACK message indicating that the first heartbeat signal was properly decoded by the NAN; and
   the heartbeat circuitry is arranged to flush the indication from the memory circuitry in response to receipt of the ACK message.

5. The apparatus of claim 1, wherein the heartbeat circuitry is arranged to:
   determine, based on information included in the second heartbeat signal, whether to include the indication of the second heartbeat signal in the first heartbeat signal.

6. The apparatus of claim 5, wherein the information included in the second heartbeat signal includes a carry forward bit, and wherein the heartbeat circuitry is arranged to:
   generate the first heartbeat signal to include the indication of the second heartbeat signal when the carry forward bit in the second heartbeat signal is set.

7. The apparatus of claim 6, wherein the carry forward bit is included in a message header section, and the indication of the second heartbeat signal is included in a message body section.

8. The apparatus of claim 7, wherein the indication of the second heartbeat signal is a Universally Unique Identifier (UUID) assigned to the second device.

9. The apparatus of claim 1, wherein the heartbeat circuitry is arranged to:
   generate another first heartbeat signal to include an indicator of the first device, wherein the indicator of the first device in the other first heartbeat signal is to facilitate discovery of the first device by the NAN; and
   cause the other first heartbeat signal to be broadcast according to a predefined interval.

10. The apparatus of claim 9, wherein the heartbeat circuitry is arranged to:
    set a carry forward bit in the other first heartbeat signal when the first device is unable to discover the NAN or is unable to be discovered by the NAN.

11. One or more non-transitory computer readable storage media (NTCRSM) comprising instructions of a heartbeat state machine, wherein execution of the instructions by a first computing device is to cause the first computing device having a first heartbeat signal, to:
    upon receipt of a second heartbeat signal broadcasted by a second computing device, enter a validity check state to check a validity of the second heartbeat signal and to control storage of information encoded in the second heartbeat signal; and
    enter a heartbeat signaling state when a result of the validity check indicates to carry forward the second heartbeat signal, wherein in the heartbeat signaling state, execution of the instructions is to cause the first computing device to:
    generate the first heartbeat signal to include an indication of the second heartbeat signal to facilitate discovery of the second computing device by a network access node (NAN), the indication being based on the stored information, and
    transmit or broadcast the first heartbeat signal to or towards the NAN according to a predefined heartbeat signaling interval.

12. The one or more NTCRSM of claim 11, wherein execution of the instructions is to cause the first computing device to:

enter the heartbeat signaling state after entering a coverage area of the NAN, wherein detection of the second heartbeat signal takes place outside of the coverage area of the NAN.

13. The one or more NTCRSM of claim 11, wherein execution of the instructions is to cause the first computing device to:
enter a memory flush state to discard the stored information of the second heartbeat signal upon receipt of an acknowledgement (ACK) message from the NAN indicating receipt of the first heartbeat signal.

14. The one or more NTCRSM of claim 11, wherein execution of the instructions is to cause the first computing device to:
determine, while in the validity check state, whether to include the indication of the second heartbeat signal in the first heartbeat signal based on information included in the second heartbeat signal.

15. The one or more NTCRSM of claim 14, wherein the information included in the second heartbeat signal includes a carry forward bit, and wherein execution of the instructions is to cause the first computing device to:
generate, while in the heartbeat signaling state, the first heartbeat signal to include the indication of the second heartbeat signal when the carry forward bit in the second heartbeat signal is set.

16. The one or more NTCRSM of claim 15, wherein the carry forward bit is included in a message header section, and the indication of the second heartbeat signal is included in a message body section.

17. The one or more NTCRSM of claim 16, wherein the indication of the second heartbeat signal is a Universally Unique Identifier (UUID) assigned to the second computing device.

18. The one or more NTCRSM of claim 11, wherein, in the heartbeat signaling state, execution of the instructions is to cause the first computing device to:
generate another first heartbeat signal to include an indicator of the first computing device, wherein the indicator of the first computing device in the other first heartbeat signal is to facilitate discovery of the first computing device by the NAN; and
cause the other first heartbeat signal to be broadcast according to a predefined interval.

19. The one or more NTCRSM of claim 18, wherein, in the heartbeat signaling state, execution of the instructions is to cause the first computing device to:
set a carry forward bit in the other first heartbeat signal when the first computing device is unable to discover the NAN or is unable to be discovered by the NAN.

20. A method to be performed by a wireless access node (WAN), the method comprising:
receiving, by the WAN, a first heartbeat signal transmitted or broadcasted from a first computing device being served by the WAN;
decoding, by the WAN, the first heartbeat signal to obtain an indication of a second heartbeat signal of a second computing device that is not being served by the WAN;
determining, by the WAN, a roaming range of the second computing device based on the indication; and
adjusting, by the WAN, one or more service configuration parameters to facilitate discovery of the second computing device.

21. The method of claim 20, further comprising:
transmitting, by the WAN, an acknowledgement (ACK) message to the first computing device, the ACK message indicating that the first heartbeat signal was properly decoded.

22. The method of claim 20, further comprising:
determining a roaming area of the second computing device.

23. The method of claim 22, wherein determining the roaming area comprising:
operating, by the WAN, one or more artificial intelligence (AI) or machine learning (ML) algorithms to predict a range of the roaming area of the second computing device.

24. The method of claim 20, wherein the WAN is a cellular base station, and the method comprises:
operating, by the WAN, one or more self-organizing network (SON) functions to determine the one or more service configuration parameters to be adjusted to facilitate discovery of the second computing device.

25. The method of claim 24, wherein the one or more service configuration parameters include one or more of antenna tilt, antenna azimuth, downlink transmit power, coverage area size, coverage area capacity, coverage area shape, one or more handover parameters, an idle mobility configuration, one or more random access channel (RACH) parameters, and one or more cell individual offset (CIO) parameters.

* * * * *